(12) United States Patent
Kutz et al.

(10) Patent No.: US 12,289,167 B2
(45) Date of Patent: Apr. 29, 2025

(54) MIRS RE-TRANSMISSION OPTIMIZATION FOR GROUPCAST UTILIZING NETWORK CODING

(71) Applicant: QUALCOMM Incorporated, San Diego, CA (US)

(72) Inventors: Gideon Shlomo Kutz, Ramat Hasharon (IL); Amit Bar-Or Tillinger, Tel-Aviv (IL); Tal Oved, Modiin (IL); Assaf Touboul, Netanya (IL)

(73) Assignee: QUALCOMM Incorporated, San Diego, CA (US)

(*) Notice: Subject to any disclaimer, the term of this patent is extended or adjusted under 35 U.S.C. 154(b) by 501 days.

(21) Appl. No.: 17/571,321

(22) Filed: Jan. 7, 2022

(65) Prior Publication Data

US 2023/0224092 A1    Jul. 13, 2023

(51) Int. Cl.
*H04W 72/04* (2023.01)
*H04L 1/00* (2006.01)
*H04L 1/1812* (2023.01)
*H04W 76/18* (2018.01)

(52) U.S. Cl.
CPC .......... *H04L 1/1819* (2013.01); *H04L 1/0057* (2013.01); *H04W 76/18* (2018.02)

(58) Field of Classification Search
CPC ............... H04L 1/1819; H04L 1/0057; H04L 2001/0093; H04W 76/18
See application file for complete search history.

(56) References Cited

U.S. PATENT DOCUMENTS

| | | | | |
|---|---|---|---|---|
| 10,574,404 | B2* | 2/2020 | Kim | H04L 1/0067 |
| 2001/0056560 | A1* | 12/2001 | Khan | H04L 1/1628 |
| | | | | 714/704 |
| 2012/0314655 | A1 | 12/2012 | Xue et al. | |
| 2020/0304246 | A1* | 9/2020 | Ahn | H04L 1/0041 |
| 2021/0385821 | A1* | 12/2021 | Yeo | H04W 72/0446 |
| 2022/0360370 | A1* | 11/2022 | Kutz | H04L 1/0057 |

FOREIGN PATENT DOCUMENTS

| | | | |
|---|---|---|---|
| EP | 1826939 | A1 | 8/2007 |
| WO | WO-2018058294 | A1 | 4/2018 |
| WO | WO-2022032189 | A1 * | 2/2022 |

OTHER PUBLICATIONS

International Search Report and Written Opinion—PCT/US2023/060042—ISA/EPO—Mar. 24, 2023.

* cited by examiner

*Primary Examiner* — Mahbubul Bar Chowdhury
(74) *Attorney, Agent, or Firm* — Holland & Hart LLP

(57) ABSTRACT

Methods, systems, and devices for wireless communications are described. A base station may transmit a set of code blocks to multiple user equipments (UEs). The base station may receive feedback pertaining to reception of each of the set of code blocks at each of the multiple UEs. The base station may generate, based on the feedback, a retransmission message that includes encoded data representative of a subset of code blocks of the set of code blocks and additional redundancy with respect to the subset of code blocks. The multiple UEs may receive the retransmission message and extract a portion corresponding the set of code blocks that were previously unsuccessfully decoded. The UEs may combine the portion of the set of code blocks with the unsuccessfully decoded code blocks to create an updated combined versions of the code blocks. The UEs may decode the combined versions of the code blocks.

30 Claims, 14 Drawing Sheets

MIRS RE-TRANSMISSION OPTIMIZATION FOR GROUPCAST UTILIZING NETWORK CODING

FIELD OF TECHNOLOGY

The following relates to wireless communications, including multi incremental redundancy scheme (MIRS) re-transmission optimization for groupcast utilizing network coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support multi incremental redundancy scheme (MIRS) re-transmission optimization for groupcast utilizing network coding. Generally, the described techniques provide for reducing a number of retransmissions for a set of code blocks while operating in accordance with a groupcast mode. For example, a transmitting wireless device may use both MIRS techniques and network coding techniques to decrease the number of retransmitted code blocks while retaining communications at or near a capacity code rate. For instance, a base station may transmit a set of code blocks to one or more user equipments (UEs) via groupcast, and may receive feedback for each of the set of code blocks at each of the one or more UEs. As such, the base station may determine candidate retransmission vectors indicative of unsuccessfully decoded code blocks for each of the respective UEs. In some examples, the base station may use one or more combining rules to combine the sets of retransmission vectors together to identify how to proceed with network coding of the code blocks to decrease the total number of retransmission messages. Upon reception of the retransmission messages each respective UE may extract a set of code blocks corresponding to unsuccessfully decoded code blocks from the previous transmission using logarithmic likelihood ratios (LLRs) and HARQ combination techniques.

A method for wireless communication at a base station is described. The method may include transmitting, via one or more first transmissions and to multiple user equipments (UEs), a set of multiple code blocks, receiving, from the multiple user equipment (UE) s, feedback pertaining to reception of each of the set of multiple code blocks at each of the multiple UEs, generating based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks, and transmitting the retransmission message to the multiple UEs.

An apparatus for wireless communication at a base station is described. The apparatus may include a processor, memory coupled with the processor, and instructions stored in the memory. The instructions may be executable by the processor to cause the apparatus to transmit, via one or more first transmissions and to multiple user equipments (UEs), a set of multiple code blocks, receive, from the multiple UEs, feedback pertaining to reception of each of the set of multiple code blocks at each of the multiple UEs, generate based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks, and transmit the retransmission message to the multiple UEs.

Another apparatus for wireless communication at a base station is described. The apparatus may include means for transmitting, via one or more first transmissions and to multiple user equipments (UEs), a set of multiple code blocks, means for receiving, from the multiple UEs, feedback pertaining to reception of each of the set of multiple code blocks at each of the multiple UEs, means for generating based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks, and means for transmitting the retransmission message to the multiple UEs.

A non-transitory computer-readable medium storing code for wireless communication at a base station is described. The code may include instructions executable by a processor to transmit, via one or more first transmissions and to multiple user equipments (UEs), a set of multiple code blocks, receive, from the multiple UEs, feedback pertaining to reception of each of the set of multiple code blocks at each of the multiple UEs, generate based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks, and transmit the retransmission message to the multiple UEs.

In some examples of the method, apparatuses, and non-transitory computer-readable medium described herein, generating the retransmission message may include operations, features, means, or instructions for determining, for each of the multiple UEs and based on the feedback, a retransmission candidate vector indicative of the unsuccessfully decoded code blocks of the set of multiple code blocks for respective UEs of the multiple UEs and combining the retransmission candidate vectors in accordance with a combining rule in order to identify a retransmission vector.

Some examples of the method, apparatuses, and non-transitory computer-readable medium described herein may further include operations, features, means, or instructions for determining that a first UE of the respective UEs indicated a successful decoding of a first code block of the set of multiple code blocks, determining that a second UE of the respective UEs indicated an unsuccessful decoding of the first code block of the set of multiple code blocks, and combining retransmission candidate vectors including the first code block based on the first UE indicating the successful decoding and the second UE indicating the unsuccessful decoding.

In some examples of the method, apparatuses, and non-transitory computer-readable medium described herein, each index of the retransmission candidate vector may be associated with a code block of the set of multiple code blocks.

In some examples of the method, apparatuses, and non-transitory computer-readable medium described herein, determining the retransmission candidate vector may include operations, features, means, or instructions for setting a first index of the retransmission candidate vector to a first variable type based on the respective UE indicating an unsuccessful decoding of an associated first code block, where the first variable type may be an integer value greater than or equal to 1 and indicates a number of units of the additional redundancy to send in the retransmission message, setting a first set of indices of the retransmission candidate vector to a second variable type based on the respective UE indicating an unsuccessful decoding of an associated first set of code blocks, and setting a second set of indices of the retransmission candidate vector to a third variable type based on the UE indicating a successful decoding of an associated second set of code blocks.

Some examples of the method, apparatuses, and non-transitory computer-readable medium described herein may further include operations, features, means, or instructions for comparing, as part of the combining in accordance with the combining rule, each index of a first retransmission candidate vector to each respective index of a second retransmission candidate vector.

Some examples of the method, apparatuses, and non-transitory computer-readable medium described herein may further include operations, features, means, or instructions for combining the first retransmission candidate vector and the second retransmission candidate vector based on each index of the first retransmission candidate vector and the respective index of the second retransmission candidate vector being of a same variable type or at least one value of each respective index pair being of the third variable type.

Some examples of the method, apparatuses, and non-transitory computer-readable medium described herein may further include operations, features, means, or instructions for combining the first variable type with the first variable type outputs the first variable type, combining the second variable type with the second variable type outputs the second variable type, combining the third variable type with the third variable type outputs the third variable type, combining the first variable type with the third variable type outputs the first variable type, and combining the second variable type with the third variable outputs the second variable type.

Some examples of the method, apparatuses, and non-transitory computer-readable medium described herein may further include operations, features, means, or instructions for stopping comparison of the first retransmission candidate vector and the second retransmission candidate vector based on at least one index of the first retransmission candidate vector being of the first variable type and the respective index of the second retransmission candidate vector being of the second variable type or vice versa.

In some examples of the method, apparatuses, and non-transitory computer-readable medium described herein, the encoded data representative of the set of code blocks of the set of multiple code blocks included in the retransmission message may be combined using exclusive-or (XOR) logic.

A method for wireless communication at a UE is described. The method may include receiving, at the UE, a set of multiple code blocks transmitted by a base station to multiple UEs via one or more first transmissions, transmitting, to the base station, feedback for each of the set of multiple code blocks, receiving, in response to transmission of the feedback, a retransmission message that includes encoded data representative of a set of code blocks of the set of multiple code blocks, the encoded data including additional redundancy with respect to the one or more first transmissions, extracting, from the retransmission message, retransmissions of a portion of the set of code blocks, the portion corresponding to unsuccessfully decoded code blocks for which the UE transmitted a negative acknowledgment, combining the retransmissions of the portion of the set of code blocks with the unsuccessfully decoded code blocks to create updated combined versions of the unsuccessfully decoded code blocks, and decoding the combined versions of the unsuccessfully decoded code blocks.

An apparatus for wireless communication at a UE is described. The apparatus may include a processor, memory coupled with the processor, and instructions stored in the memory. The instructions may be executable by the processor to cause the apparatus to receive, at the UE, a set of multiple code blocks transmitted by a base station to multiple UEs via one or more first transmissions, transmit, to the base station, feedback for each of the set of multiple code blocks, receive, in response to transmission of the feedback, a retransmission message that includes encoded data representative of a set of code blocks of the set of multiple code blocks, the encoded data including additional redundancy with respect to the one or more first transmissions, extract, from the retransmission message, retransmissions of a portion of the set of code blocks, the portion corresponding to unsuccessfully decoded code blocks for which the UE transmitted a negative acknowledgment, combine the retransmissions of the portion of the set of code blocks with the unsuccessfully decoded code blocks to create updated combined versions of the unsuccessfully decoded code blocks, and decode the combined versions of the unsuccessfully decoded code blocks.

Another apparatus for wireless communication at a UE is described. The apparatus may include means for receiving, at the UE, a set of multiple code blocks transmitted by a base station to multiple UEs via one or more first transmissions, means for transmitting, to the base station, feedback for each of the set of multiple code blocks, means for receiving, in response to transmission of the feedback, a retransmission message that includes encoded data representative of a set of code blocks of the set of multiple code blocks, the encoded data including additional redundancy with respect to the one or more first transmissions, means for extracting, from the retransmission message, retransmissions of a portion of the set of code blocks, the portion corresponding to unsuccessfully decoded code blocks for which the UE transmitted a negative acknowledgment, means for combining the retransmissions of the portion of the set of code blocks with the unsuccessfully decoded code blocks to create updated combined versions of the unsuccessfully decoded code blocks, and means for decoding the combined versions of the unsuccessfully decoded code blocks.

A non-transitory computer-readable medium storing code for wireless communication at a UE is described. The code may include instructions executable by a processor to receive, at the UE, a set of multiple code blocks transmitted by a base station to multiple UEs via one or more first transmissions, transmit, to the base station, feedback for each of the set of multiple code blocks, receive, in response to transmission of the feedback, a retransmission message that includes encoded data representative of a set of code blocks of the set of multiple code blocks, the encoded data including additional redundancy with respect to the one or more first transmissions, extract, from the retransmission message, retransmissions of a portion of the set of code blocks, the portion corresponding to unsuccessfully decoded code blocks for which the UE transmitted a negative acknowledgment, combine the retransmissions of the portion of the set of code blocks with the unsuccessfully decoded code blocks to create updated combined versions of the unsuccessfully decoded code blocks, and decode the combined versions of the unsuccessfully decoded code blocks.

In some examples of the method, apparatuses, and non-transitory computer-readable medium described herein, transmitting the feedback for each of the set of multiple code blocks may include operations, features, means, or instructions for indicating a respective value representing an amount of additional redundancy for at least one of the code blocks of the set of multiple code blocks.

In some examples of the method, apparatuses, and non-transitory computer-readable medium described herein, extracting the retransmissions of the portion of the set of code blocks may include operations, features, means, or instructions for generating a first set of logarithmic likelihood ratios (LLRs) associated with the retransmissions of the portion of the set of code blocks.

Some examples of the method, apparatuses, and non-transitory computer-readable medium described herein may further include operations, features, means, or instructions for performing a sign flip on the first set of LLRs associated with the retransmissions of the portion of the set of code blocks to generate a set of sign-flipped LLRs.

In some examples of the method, apparatuses, and non-transitory computer-readable medium described herein, combining the retransmissions of the portion of the set of code blocks with the unsuccessfully decoded code blocks may include operations, features, means, or instructions for performing a hybrid automatic repeat request (HARQ) combination of the retransmissions of the portion of the set of code blocks with the unsuccessfully decoded code blocks.

In some examples of the method, apparatuses, and non-transitory computer-readable medium described herein, the unsuccessfully decoded code blocks may be associated with respective sets of LLRs.

In some examples of the method, apparatuses, and non-transitory computer-readable medium described herein, the retransmission message may be modulated.

DETAILED DESCRIPTION

In some examples of wireless communications systems, one or more wireless devices may operate in accordance with a multi incremental redundancy scheme (MIRS). In some cases, MIRS may be used to determine an efficient modulation coding scheme (MCS) and achieve communication between wireless devices at or near a capacity code rate. For example, a transmitting wireless device may utilize a small sized re-transmission (e.g., an incremental retransmission hybrid automatic repeat request (IR-HARQ)) for fine, dynamic adaptation of the coding rate, based on feedback from a corresponding receiving wireless device (e.g., acknowledgment (ACK) or negative-ACK (NACK) messages). That is, each time the receiver sends a NACK (or alternatively, refrains from sending ACK feedback) the transmitting wireless device may include a small number of additional redundancy bits for a given retransmission. In some cases, however, (e.g., in groupcast) it may be advantageous for the wireless devices to decrease the number of retransmitted code blocks to a group of wireless devices.

A transmitting wireless device may decrease a number of retransmitted code blocks to a set of receiving wireless devices via groupcasting according to the techniques described herein. For example, the transmitting wireless device may use both MIRS techniques and network coding techniques to decrease the number of retransmitted code blocks while retaining communications at or near a capacity code rate. For instance, a base station may transmit a set of code blocks to one or more user equipments (UEs) via groupcast, and may receive feedback (e.g., ACK/NACK) for each of the set of code blocks at each of the one or more UEs. As such, the base station may determine candidate retransmission vectors indicative of unsuccessfully decoded code blocks for each of the respective UEs. In some examples, the base station may use one or more combining rules to combine the sets of retransmission vectors together to identify how to proceed with network coding of the code blocks to decrease the total number of retransmission messages. Upon reception of the retransmission messages each respective UE may extract a set of code blocks corresponding to unsuccessfully decoded code blocks from the previous transmission using logarithmic likelihood ratios (LLRs) and HARQ combination techniques. Additional redundancy may be added to the network-encoded retransmissions using MIRS techniques.

Aspects of the disclosure are initially described in the context of wireless communications systems. Aspects of the disclosure are further illustrated by algorithmic retransmission procedures and process flows. Aspects of the disclosure are further illustrated by and described with reference to apparatus diagrams, system diagrams, and flowcharts that relate to MIRS re-transmission optimization for groupcast utilizing network coding.

Figure 1:
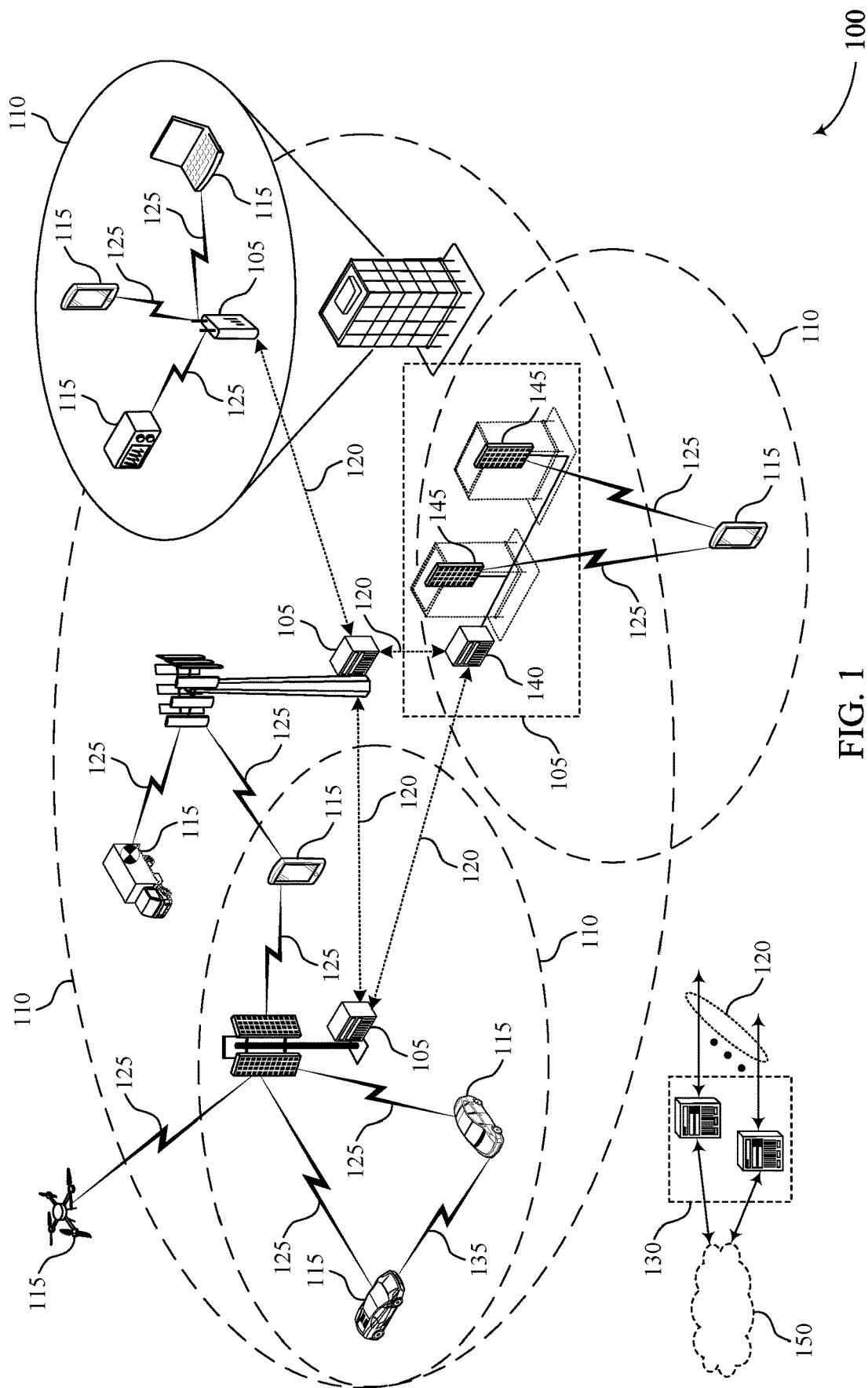
FIG. 1 illustrates an example of a wireless communications system that supports multi incremental redundancy scheme (MIRS) re-transmission optimization for groupcast utilizing network coding in accordance with aspects of the present disclosure.

FIG. 1 illustrates an example of a wireless communications system 100 that supports MIRS re-transmission optimization for groupcast utilizing network coding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples of wireless communications system 100, one or more wireless devices may operate in accordance with MIRS techniques. For example, a first wireless device (e.g., a base station 105) may use MIRS to determine an efficient MCS and achieve communication with a second wireless devices (e.g., a UE 115) at or near a capacity code rate. For example, the base station 105 may utilize a small sized re-transmission (e.g., IR-HARQ) for fine, dynamic adaptation of the coding rate, based on feedback from a corresponding UE 115 (e.g., acknowledgment (ACK) or non-ACK (NACK) messages). That is, each time the UE 115 sends a NACK (or alternatively, refrains from sending feedback) the base station 105 may include a small number of additional redundancy bits for a given retransmission.

In some examples, the base station 105 may decrease a number of retransmitted code blocks to a set of receiving UEs 115 via groupcasting according to the techniques described herein. For example, the base station 105 may use both MIRS techniques and network coding techniques to decrease the number of retransmitted code blocks while retaining communications at or near a capacity code rate. For instance, the base station 105 may transmit a set of code blocks to one or more UEs 115, and may receive feedback (e.g., ACK/NACK) for each of the set of code blocks at each of the one or more UEs 115. As such, the base station 105 may determine candidate retransmission vectors indicative of unsuccessfully decoded code blocks for each of the respective UEs 115. In some examples, the base station 105 may use one or more combining rules to combine the sets of retransmission vectors together to identify how to proceed with network coding of the code blocks to decrease the total number of retransmission messages. Further discussion of candidate retransmission vector combination techniques are described herein, including with reference to FIG. 3.

Upon reception of the retransmission messages each respective UE 115 may extract a set of code blocks corresponding to unsuccessfully decoded code blocks from the previous transmission by generating a set of LLRs associated with the retransmission messages and HARQ combination techniques. Additional redundancy may be added to the network-encoded retransmissions using MIRS techniques. For example, during feedback, each UE 115 may utilize gap to capacity (GTC) techniques that may indicate to the base station 105 an additional number of redundancy bits to include in retransmission of a given code block. Further discussion of code block extraction and HARQ combination techniques are described herein, including with reference to FIG. 2.

Figure 2:
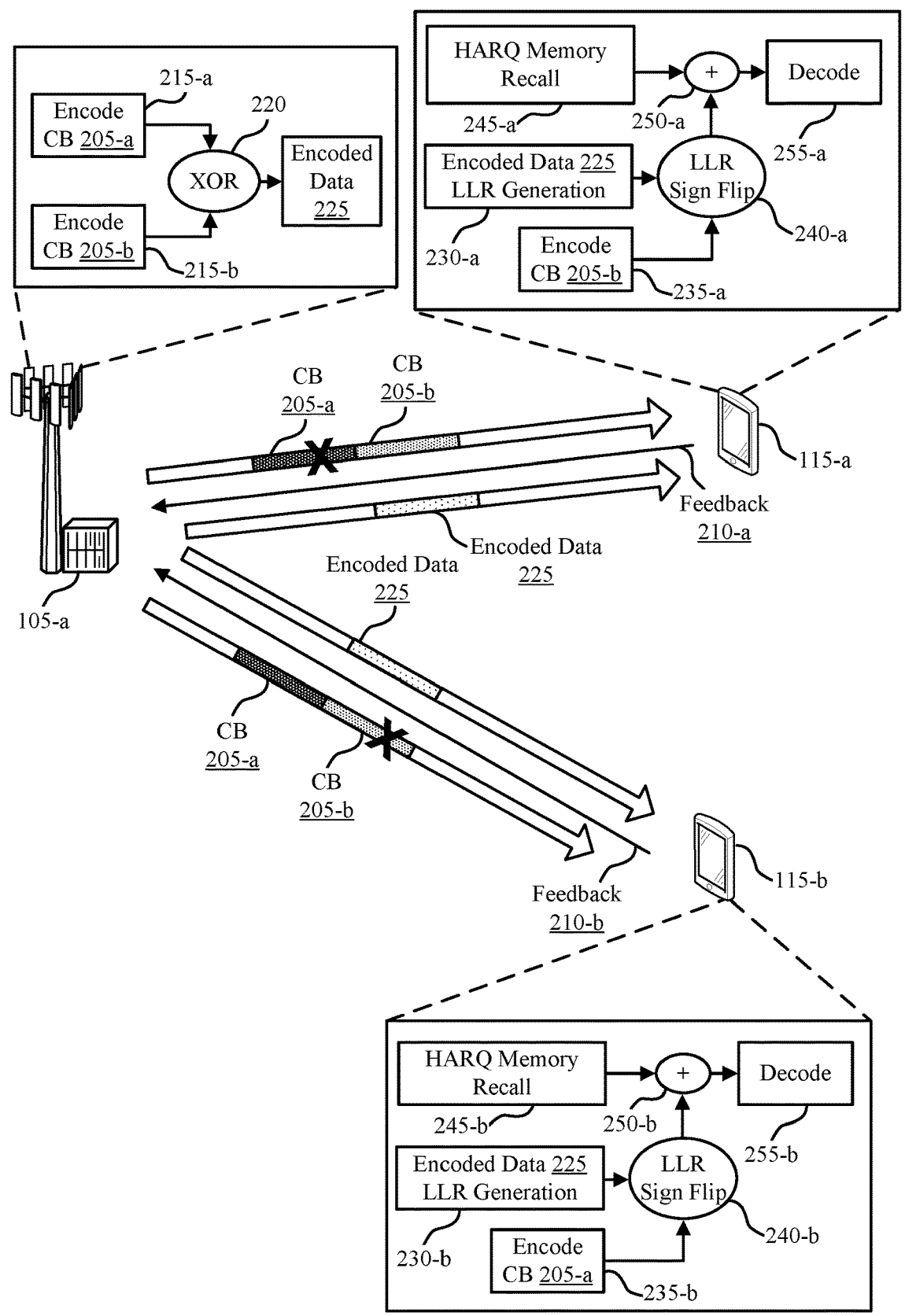
FIG. 2 illustrates an example of a wireless communications system that supports MIRS re-transmission optimization for groupcast utilizing network coding in accordance with aspects of the present disclosure.

FIG. 2 illustrates an example of a wireless communications system 200 that supports MIRS re-transmission optimization for groupcast utilizing network coding in accordance with aspects of the present disclosure. The wireless communications system 200 may implement or be implemented by one or more aspects of the wireless communications system 100. For example, the wireless communications systems 200 may include a UE 115-a and a UE 115-b as well as a base station 105-a which may be respective examples of UEs 115 and a base station 105, as described with reference to FIG. 1. In some examples, the UEs 115 and the base station 105-a may operate in accordance with a combination MIRS techniques and network coding techniques to decrease a number of retransmitted code blocks 205 for a groupcast transmission. It is noted that, while examples of some numbers of devices and types of devices are described herein, any number of devices and device types may support the techniques described in the present disclosure.

As illustrated in FIG. 2, the base station 105-a may perform a set of one or more wireless communications with the UE 115-a and the UE 115-b. For example, the base station 105-a may transmit a set of code blocks 205 to both the UE 115-a and the UE 115-b (e.g., a code block 205-a and a code block 205-b). In some examples, the set of code blocks 205 may be transmitted by the base station 105-a via a groupcast transmission such that the groupcast transmission includes a set of parameters identifying which wireless devices intended for reception (e.g., respective IDs associated with the UE 115-a and the UE 115-b). In some examples, the UEs 115 may not receive one or more code blocks 205 from the set of code blocks 205 (e.g., based on channel interference, self-interference, or physical barriers including buildings or passing cars, among other examples). For instance, in the example of wireless communications system 200, the UE 115-a may receive the code block 205-b and not the code block 205-a while the UE 115-b may receive the code block 205-a and not the code block 205-b.

As such, the UEs 115 may generate and transmit, to the base station 105-a, respective ACK/NACK feedback 210 messages indicating which of the code blocks 205 were received and which of the code blocks were not received. For example, the feedback 210 messages may include a set of bits where each bit corresponds to a respective code block 205 such that a bit of value '1' may indicate ACK for the respective code block 205 and a bit of value '0' may indicate NACK for the respective code block 205. Additionally or alternatively, a UE 115 may indicate to the base station 105-a a NACK for a given code block 205 by refraining from transmitting feedback for the given code block 205. In some examples, the UEs 115 may operate in accordance with MIRS techniques such that the feedback 210 messages may also include a GTC identifier which indicates a level of redundancy for the base station 105-a to include in retransmission of each NACKed code block 205. For example, instead of sending a bit value of '0' for NACK and a bit value of '1' for ACK, a UE 115 may send a value of "0-n" where n is an integer value and indicates a number of additional units of redundancy to include in retransmission of a given code block 205. In cases where a UE 115 refrains from including a GTC identifier, the retransmission may include one additional unit of redundancy for each NACKed code block 205.

Based on receiving the respective feedback 210 messages from the UE 115-a and the UE 115-b, the base station 105-a may generate encoded data 225 to transmit in a groupcast retransmission. When generating the encoded data 225, the base station 105-a may include information from each code block 205 that at least one UE 115 of the set of UEs 115 indicated a NACK response for. While FIG. 2 provides an example of ACK/NACK feedback 210 for respective code blocks 205, it is understood that the techniques described herein may be applied to transport blocks, code block groups, or any other granularity of data size for which ACK/NACK feedback is used.

For generation of the groupcast retransmission, the base station 105-a may utilize MIRS techniques and include a number of additional redundancy bits for each NACKed code block 205 as indicated in the feedback 210 messages. In some examples, the additional redundancy bits may be HARQ combined with previous transmissions of the respective code blocks 205. In some examples, the base station 105-a may continue to generate groupcast retransmissions until each code block 205 is successfully decoded by each UE 115 included in the groupcast. When operating in accordance with a groupcast mode, each UE 115 may have different code blocks 205 that were successfully decoded and other code blocks 205 that were unsuccessfully decoded. As such, the base station 105-a may apply network coding techniques in addition to MIRS techniques, to reduce the overall number of re-transmitted code blocks 205.

FIG. 2 illustrates an example procedure at the base station 105-a for generating the encoded data 225 for groupcast retransmission using both MIRS and network coding techniques. For example, based on receiving the respective feedback 210 messages from the UE 115-a and the UE 115-b, the base station 105-a may determine that the UE 115-a received code block 205-b but did not receive code block 205-a and UE 115-b received code block 205-a but did not receive code block 205-b. Based on MIRS techniques, the base station 105-a may transmit additional redundancy bits for both code block 205-a and code block 205-b. As such, at 215, the base station 105-a may encode both the code block 205-a and the code block 205-b and include a combination of the code blocks 205 in the encoded data 225. In the example of FIG. 2, the base station 105-a may use network coding to reduce the number of resources for the groupcast retransmission. For instance, the base station 105-a may transmit a single message that includes an additional redundancy of a coded message of the encoded data 225. As such, at 220, the base station 105-a may combine the contents of the encoded code block 205-a and of the encoded code block 205-b using exclusive-or (XOR) logic to generate the encoded data 225 (e.g., encoded data 225=(code block 205-a @ code block 205-b)). By utilizing the network coding techniques described herein, the base station 105-a may reduce the number of groupcast retransmissions for a set of code blocks 205, which may reduce resource consumption, reduce signaling overhead, and reduce processing power. Further examples of network coding for groupcast retransmissions at a base station 105 are described herein, including with reference to FIG. 3.

Based on generating the encoded data 225, the base station 105-a may modulate and transmit the encoded data 225 to the set of UEs 115 in the groupcast (e.g., the UE 115-a and the UE 115-b). At 230, the UEs 115 may receive the encoded data 225 and generate a first set of LLRs associated with the encoded data 225. At 235, the UEs 115 may encode respective code blocks 205 that were successfully decoded from previous transmissions. For example, the UE 115-a may encode the code block 205-b and generate a set of signed bits associated with the code block 205-b and the UE 115-b may encode the code block 205-a and generate a set of signed bits associated with the code block 205-a. At 240, each UE 115 may perform a sign flip on the first set of LLRs associated with the encoded data 225. At 245, the UEs 115 may each recall respective HARQ memory associated with the previous groupcast transmissions. For example, the UE 115-a may recall a set of LLRs associated with unsuccessfully decoded code block 205-a and the UE 115-b may recall a set of LLRs associated with unsuccessfully decoded code block 205-b. As such, at 250, each UE 115 may HARQ combine their respective HARQ memory with the sign flipped LLRs to construct the set of code blocks 205 that were previously unsuccessfully decoded. At 255, each UE 115 may decode the constructed sets of code blocks 205.

As such, the UE 115-a may successfully decode the contents of code block 205-a and the UE 115-b may successfully decode the contents of code block 205-b. While FIG. 2 illustrates an example of network coding for a groupcast including two UEs 115 and two code blocks 205, the techniques described herein may be applied to any number of UEs 115 and any number of code blocks 205. For example, FIG. 3 provides an example of three UEs 115 in a groupcast transmission associated with four code blocks 205.

Figure 3:
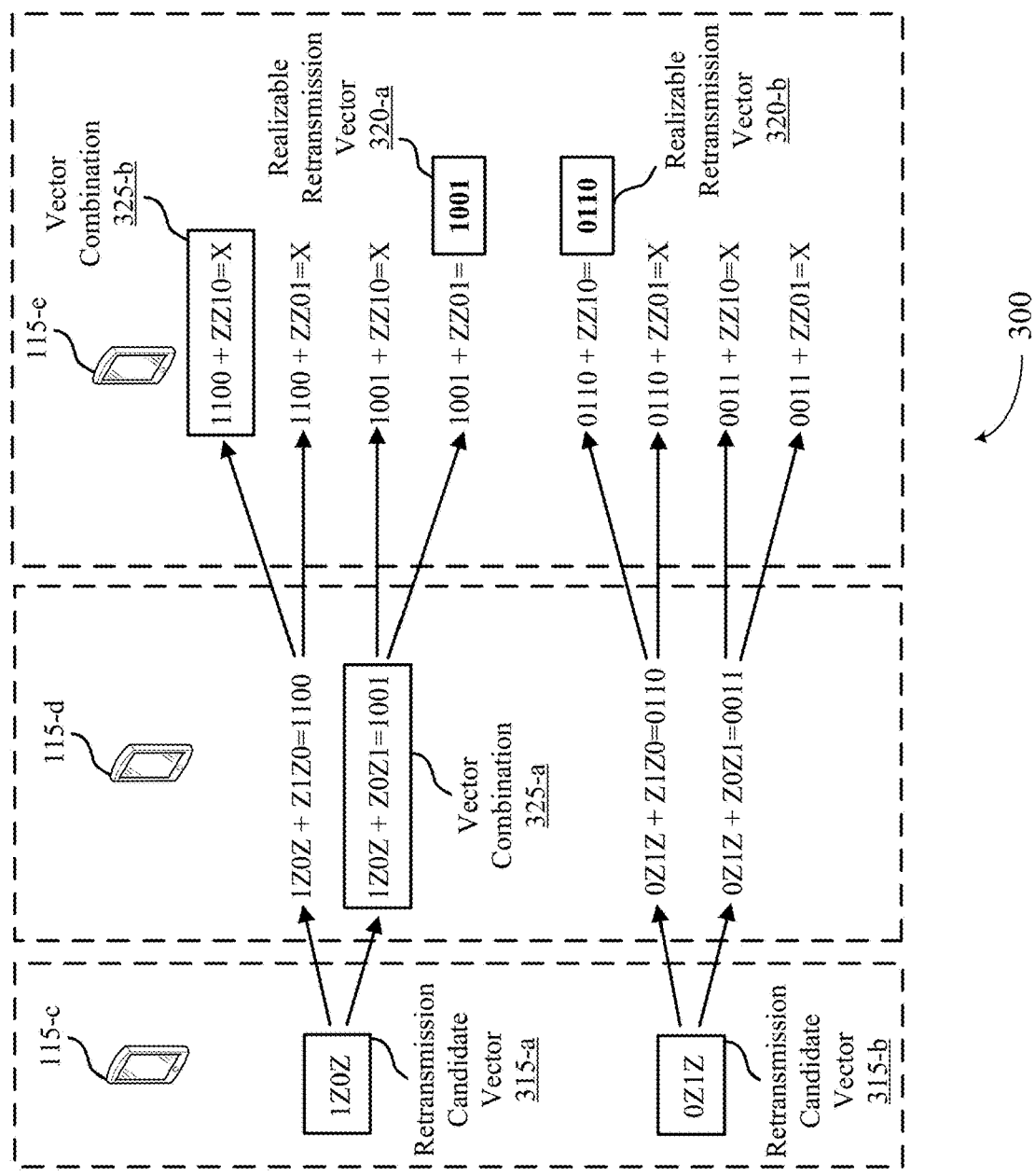
FIG. 3 illustrates an example of an algorithmic retransmission procedure that supports MIRS re-transmission optimization for groupcast utilizing network coding in accordance with aspects of the present disclosure.
Figure 3:
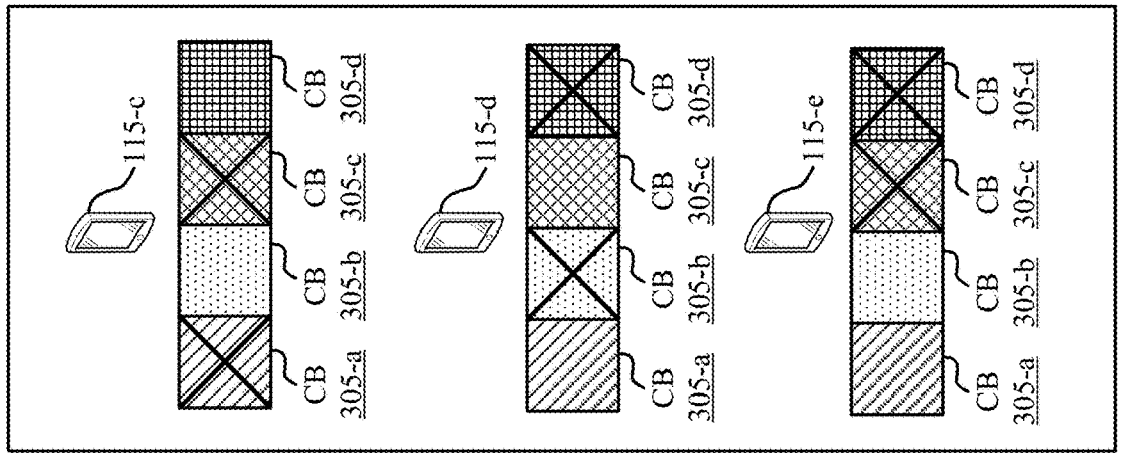

FIG. 3 illustrates an example of an algorithmic retransmission procedure 300 that supports MIRS re-transmission optimization for groupcast utilizing network coding in accordance with aspects of the present disclosure. The algorithmic retransmission procedure 300 may implement or be implemented by one or more aspects of the wireless communications system 100, the wireless communications system 200, or a combination thereof. For example, the algorithmic retransmission procedure 300 may include UEs 115-c through 115-e which may be respective examples of UEs 115, as described with reference to FIG. 1. The algorithmic retransmission procedure 300 may also depict network coding retransmission algorithm conducted at a transmitting wireless device which may be an example of a base station 105 with reference to FIG. 1. In some examples, the base station 105 may operate in accordance with the algorithmic retransmission procedure 300 to decrease a number of retransmitted code blocks 305 for a groupcast transmission to the UEs 115. It is noted that, while examples of some numbers of devices and types of devices are described herein, any number of devices and device types may support the techniques described in the present disclosure.

FIG. 3 provides an example of a groupcast transmission between the base station 105 and the UEs 115-c through 115-e that includes a set of code blocks 305 (e.g., code blocks 305-a through 305-d). As illustrated in FIG. 3, each UE 115 may successfully decode one or more of the code blocks 305 and may unsuccessfully decode one or more other code blocks 305. For instance, the UE 115-c may successfully decode code blocks 305-b and 305-d but fail to decode code blocks 305-a and 305-c, the UE 115-d may successfully decode code blocks 305-a and 305-c but fail to decode code blocks 305-b and 305-d, and the UE 115-e may successfully decode code blocks 305-a and 305-b but fail to decode code blocks 305-c and 305-d. As such, each UE 115 may generate and transmit respective ACK/NACK feedback messages to the base station 105 indicating which code blocks 305 were successfully decoded and which code block 305 were unsuccessfully decoded. In some examples, the UEs 115 may transmit feedback messages in correspondence with the feedback 210 messages, described herein with reference to FIG. 2. For example, the UE 115-d may transmit a set of bits [0,1,0,1], the UE 115-d may transmit a set of bits [1,0,1,0], and the UE 115-e may transmit a set of [1,1,0,0], where a bit of value '1' indicates successful decoding of the respective code block 305 and a bit of value '0' indicates unsuccessful decoding of the respective code block 305.

Based on receiving the respective feedback messages from each of the UEs 115, the base station 105 may operate in accordance with the techniques of algorithmic retransmission procedure 300 to determine the contents of encoded data for retransmission. The retransmission algorithm described in the context of FIG. 3 may utilize code blocks that were correctly decoded by at least a first subset of the UEs 115 and not correctly decoded by a second subset of the UEs 115. If a given code block 305 was successfully decoded by all UEs 115 in the group, the base station 105 may no longer consider the given code block 305. If a given code block 305 was not decoded successfully by any of the UEs 115 in the group, the base station 105 may retransmit the code block 305 without using network coding techniques, with a set of redundancy based on an MIRS scheme. As such, the base station 105 may utilize network coding techniques for each of the code blocks 305-a through 305-d.

In accordance with the techniques described herein, the base station 105 may create a set of retransmission candidate vectors for each UE 115 representing the missing code blocks at each UE 115. In some examples, the base station 105 may generate the retransmission candidate vectors where each index of the vector corresponds to a code block 305 and is given a value of '1', a value of '0', or a value of 'Z'. For instance, an index corresponding to first NACKed code block 305 is given a value of '1', all other indices corresponding to other NACKed code blocks 305 are given a value of '0', and all indices corresponding to ACKed code blocks 305 are given a value of 'Z'. As such, each UE 115 may have an associated number of retransmission candidate vectors 315 equal to the number of NACKed code blocks 305 indicated. For example, with reference to the UE 115-c, the base station 105 may construct a first retransmission candidate vector 315-a of [1Z0Z] which may be associated with unsuccessful decoding of the code block 305-a and may construct a second retransmission candidate vector 315-b of [0Z1Z] which may be associated with unsuccessful decoding of the code block 305-c. The base station 105 may also construct retransmission candidate vectors 315 for the UE 115-d and the UE 115-e such that the UE 115-d may be associated with the retransmission candidate vectors 315 [Z1Z0] and [Z0Z1] and the UE 115-e may be associated with the retransmission candidate vectors 315 [ZZ10] and [ZZ01].

Based on creating the set of retransmission candidate vectors 315 for each UE 115, the base station 105 may combine each the retransmission candidate vectors 315 starting with the UE 115 with the most NACK associated code blocks 305. With reference to FIG. 3, each UE 115 is associated with two NACKed code blocks 305, and as such, the base station 105 may determine to combine the retransmission candidate vectors 315 in any order of the UEs 115. As illustrated in FIG. 3, the base station 105 may start with the retransmission candidate vectors 315 of the UE 115-c, combing each of these retransmission candidate vectors 315 with each retransmission candidate vector 315 of the UE 115-d. From here, the base station 105 may combine the resulting set of combined retransmission candidate vectors 315 of the UE 115-c and the UE 115-d with each retransmission candidate vector 315 of the UE 115-e.

In some cases, two retransmission candidate vectors 315 may be combined such that each index of a first retransmission candidate vector 315 is combined with the corresponding index of a second retransmission candidate vector 315 in accordance with the vector combination rules of Table 1.

TABLE 1

| First Vector Index-i | Second Vector Index-i | Output Index-i |
|---|---|---|
| 0 | 0 | 0 |
| 0 | 1 | X |

TABLE 1-continued

| First Vector Index-i | Second Vector Index-i | Output Index-i |
|---|---|---|
| 0 | Z | 0 |
| 1 | 0 | X |
| 1 | 1 | 1 |
| 1 | Z | 1 |
| Z | 0 | 0 |
| Z | 1 | 1 |
| Z | Z | Z |

As indicated in Table 1, a combination of '0' and '1' may result in a value of 'X' (e.g., an unrealizable vector). If any index of the output retransmission candidate vector 315 is of the value 'X', the process of combining the first retransmission candidate vector 315 and the second retransmission candidate vector 315 may be stopped and not used in further vector combinations 325. For example, with reference to FIG. 3, the vector combination 325-b results in an unrealizable vector based on the second index of the first retransmission candidate vector 315 being of a value '1' and the second index of the second retransmission candidate vector 315 being of a value '0'. In contrast, the vector combination 325-a results in a realizable vector combination 325, and as such, the resulting output retransmission candidate vector 315 may be used in continuing vector combination 325 calculations. In an example where a given retransmission candidate vector 315 is not combined with another retransmission candidate vector 315, the base station 105 may transmit the code blocks 305 indicated in the given retransmission candidate vector 315 to the associated UE 115 without network coding.

As illustrated in FIG. 3, the base station 105 may iterate through all possible combinations of the retransmission candidate vectors 315 and utilize each realizable retransmission vector 320 to generate one or more retransmissions to the UEs 115. In the example of FIG. 3, the realizable retransmission vector 320-a (e.g., [1001]) and the realizable retransmission vector 320-b (e.g., [0110]) may be used to generate two network encoded retransmissions. For example, the realizable retransmission vector 320-a may be used to construct encoded data for a first retransmission that combines the contents of code blocks 305-a and 305-d using XOR logic and the realizable retransmission vector 320-b may be used to construct encoded data for a second retransmission that combines the contents of code blocks 305-b and 305-c using XOR logic. As such, the base station 105 may transmit the two retransmissions using groupcast to the UEs 115-c through 115-e, while other conventional retransmission schemes may use at four retransmissions. As such, the base station 105 may reduce the number of groupcast retransmissions for the set of code blocks 305, which may reduce resource consumption, reduce signaling overhead, reduce processing power, improve spectral efficiency of the system, and reduce transmission power.

In some examples, the vector combination 325 rules indicated in Table 1 may be adapted to include techniques to support GTC. For example, as described with reference to FIG. 2, a UE 115 may send a value of '0-n' in regards to a NACKed code block 305, where 'n' is an integer value that indicates a number of additional units of redundancy to include in retransmission of a given code block 305. As such, the base station 105 may construct the retransmission candidate vectors 315 based on the redundancy indicated by a UE 115 for a given code block. For example, if the UE 115-c transmitted the value "0-n" with reference to the code block 305-*a* during feedback, the base station 105 may construct a retransmission candidate vector 315-*a* as [nZ0Z], indicating the 'n' units of redundancy associated with the code block 305-*a*. As such, the combining rules may be augmented such that when combining two 'n' values, the greatest of the two 'n' values is the resulting output. For example, combing an index of value '2' and an index of value '1' would result in an output index value of '2'. In some examples, combining any index value of 'n' with an index value of '0' may result in an unrealizable vector. Based on the augmented rules adjusted for GTC, the base station 105 may iterate through all possible combinations of the retransmission candidate vectors 315 and include a number of units of redundancy for each respective code block 305 equal to the associated index value of the retransmission vector. The base station 105 may also increment all indices of a retransmission vector with a value greater than 'O' to the largest index value of the retransmission vector. For example, the base station 105 may update a retransmission vector of to [0330], such that the base station 105 may include three units of redundancy for code block 305-*b* and three units of redundancy for code block 305-*c*. In some cases, there may be multiple equivalent ways to encode one or more retransmissions. As such, the base station 105 may utilize the encoding technique option that results in realizable retransmission vectors 320 having a decreased size of retransmission. For example the value of 'n' for a given realizable retransmission vector 320 may control the size of the retransmission, and as such, the base station 105 may use the encoding technique option that outputs the lowest value of 'n' for the given realizable retransmission vector 320.

Figure 4:
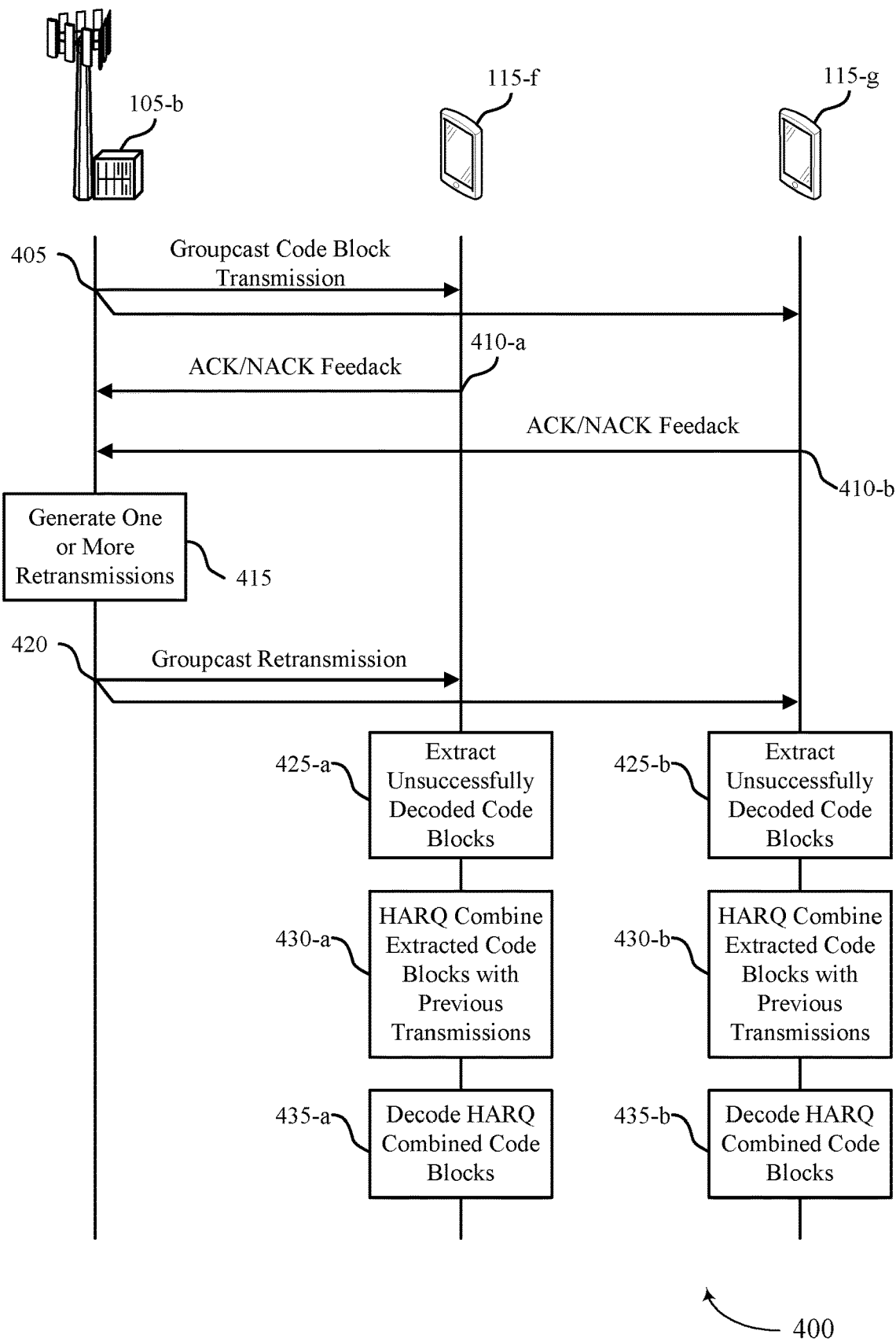
FIG. 4 illustrates an example of a process flow that supports MIRS re-transmission optimization for groupcast utilizing network coding in accordance with aspects of the present disclosure.

FIG. 4 illustrates an example of a process flow 400 that supports MIRS re-transmission optimization for groupcast utilizing network coding in accordance with aspects of the present disclosure. In some examples, process flow 400 may implement aspects of the wireless communications system 100, the wireless communications system 200, the algorithmic retransmission procedure 300, or a combination thereof. The process flow 400 includes a UE 115-*f* and a UE 115-*g* as well as a base station 105-*b* which may be respective examples of UEs 115 and a base station 105 with reference to FIG. 1. Alternative examples of the following may be implemented, where some steps are performed in a different order than described or are not performed at all. In some cases, steps may include additional features not mentioned below, or further steps may be added. In addition, while process flow 400 shows processes between the UE 115-*f*, the UE 115-*g*, and the base station 105-*b*, it should be understood that these processes may occur between any number of network devices.

At 405, the base station 105-*b* may transmit, via one or more first transmissions, a set of code blocks to the UE 115-*f* and the UE 115-*g*. In some examples, the one or more first transmissions may be an example of groupcast transmissions. At 410, the base station 105-*b* may receive from the UE 115-*f* and the UE 115-*g* respective ACK/NACK feedback pertaining to reception of each of the set of code blocks at each UE 115. In some examples, the ACK/NACK feedback may indicate a value representing an amount of additional redundancy for the base station 105-*b* to include in retransmission of each unsuccessfully decoded code block for the respective UE 115.

At 415, the base station 105-*b* may generate based on the feedback, one or more retransmission messages that may include encoded data representative of a subset of code blocks of the set of code blocks transmitted at 405. In some examples, the encoded data may include the set of code blocks including a portion of code blocks that corresponds to one or more of unsuccessfully decoded code blocks and additional redundancy indicative of the additional redundancy requested in the ACK/NACK feedback.

In some examples, generating the retransmission message includes determining, for each of the UEs 115 and based on the ACK/NACK feedback, one or more retransmission candidate vectors indicative of the unsuccessfully decoded code blocks of the set of code blocks for the respective UEs 115. Based on generating the one or more retransmission candidate vectors for each UE 115, the base station 105-*b* may combine the retransmission candidate vectors in accordance with a combining rule in order to identify one or more realizable retransmission vectors. In some examples, each index of the retransmission candidate vector may be associated with a code block of the set of code blocks.

In some cases, the base station 105-*b* may determine which code blocks to associate with the retransmission candidate vectors based on a given code block fulfilling a set of conditions. For example, the base station 105-*b* may include first code block if at least one UE 115 of the respective UEs 115 (such as the UE 115-*f*) indicated a successful decoding of the first code block while at least one other UE 115 of the respective UEs 115 (such as the UE 115-*g*) indicated an unsuccessful decoding of the first code block.

In some examples, the base station 105-*b* may set each index of a retransmission candidate vector to one of three variable types. For example, the base station 105-*b* may set a first index of the retransmission candidate vector to a first variable type of 'n' based on the respective UE indicating an unsuccessful decoding of an associated first code block, where 'n' is an integer value greater than or equal to 1 and indicates a number of units of the additional redundancy to send in the retransmission message. The base station 105-*b* may also set a first set of indices of the retransmission candidate vector to a second variable type of '0' based on the respective UE indicating an unsuccessful decoding of an associated first set of code blocks. The base station 105-*b* may also set a second set of indices of the retransmission candidate vector to a third variable type of 'Z' based on the UE indicating a successful decoding of an associated second set of code blocks.

Based on setting a variable type for each index of each retransmission candidate vector, the base station 105-*b* may compare, as part of the combining in accordance with the combining rule, each index of a first retransmission candidate vector to each respective index of a second retransmission candidate vector. In some examples, combining the first retransmission candidate vector and the second retransmission candidate vector may be based on each index of the first retransmission candidate vector and the respective index of the second retransmission candidate vector being of a same variable type or at least one value of each respective index pair being of the third variable type 'Z'. In some examples, combining the variable 'n' with the variable 'n' may output the variable 'n', combining the variable '0' with the variable '0' may output the variable '0', combining the variable 'Z' with the variable 'Z' may output the variable 'Z', combining the variable 'n' with the variable 'Z' may output the variable 'n', and combining the variable '0' with the variable 'Z' may output the variable '0'. In some examples, the base station 105-*b* may stop comparison of the first retransmission candidate vector and the second retransmission candidate vector based on at least one index of the first retransmission candidate vector being of the variable 'n' and the respective index of the second retransmission candidate vector being of the variable '0' or vice versa.

Based on combining each of the retransmission candidate vectors, the base station 105-*b* may generate one or more realizable retransmission vectors, where each of the one or more realizable retransmission vectors may be used to generate a respective network coded groupcast retransmission message. In some examples, the encoded data representative of the subset of code blocks of the set of code blocks included in each retransmission message is combined using XOR logic.

At 420, the base station 105-*b* may transmit the one or more retransmission messages that may include encoded data and additional redundancy with respect to the one or more first transmissions at 405. In some examples, the one or more retransmission messages may be modulated.

At 425, each UE 115 may extract, from the one or more retransmission messages, retransmissions of a portion of the set of code blocks, where the portion may be associated with unsuccessfully decoded code blocks for which the respective UE transmitted a NACK for in the feedback message at 410. In some examples, each UE 115 may generate a first set of LLRs associated with the retransmissions of the portion of the set of code blocks. As such, each UE 115 may perform a sign flip on the first set of LLRs to generate a set of sign-flipped LLRs.

At 430, each UE 115 may combine the set of sign-flipped LLRs with a set of LLRs associated with unsuccessfully decoded code blocks to create updated combined versions of the unsuccessfully decoded code blocks. In some examples, the combining may be an example of a HARQ combination. At 430, each UE 115 may decode the HARQ combined versions of the unsuccessfully decoded code blocks. In some examples, some of the UEs 115 may still be unable to successfully decode one or more of the code blocks. In such examples, the UEs 115 may revert to step 410 and transmit another set of ACK/NACK feedback messages, and as such the wireless devices of process flow 400 may repeat steps 410 through 435 until each code block is decoded by each UE. In some examples, the base station 105 may use a different encoding rule based on the ACK/NACK feedback messages received from the UEs 115.

Figure 5:
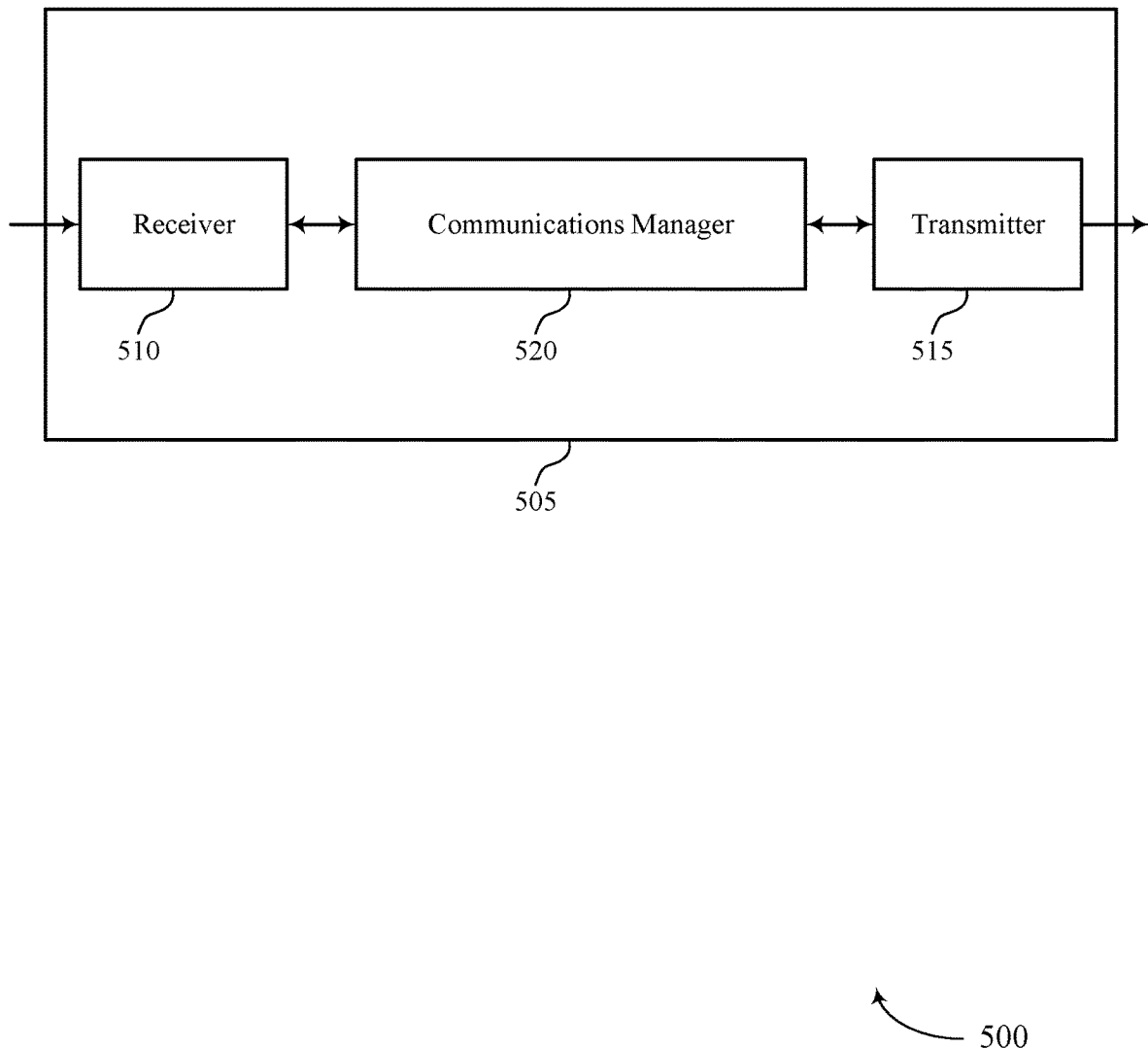
FIGS. 5 and 6 show block diagrams of devices that support MIRS re-transmission optimization for groupcast utilizing network coding in accordance with aspects of the present disclosure.

FIG. 5 shows a block diagram 500 of a device 505 that supports MIRS re-transmission optimization for groupcast utilizing network coding in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to MIRS re-transmission optimization for groupcast utilizing network coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to MIRS re-transmission optimization for groupcast utilizing network coding). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of MIRS re-transmission optimization for groupcast utilizing network coding as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a base station in accordance with examples as disclosed herein. For example, the communications manager 520 may be configured as or otherwise support a means for transmitting, via one or more first transmissions and to multiple UEs, a set of multiple code blocks. The communications manager 520 may be configured as or otherwise support a means for receiving, from the multiple UEs, feedback pertaining to reception of each of the set of multiple code blocks at each of the multiple UEs. The communications manager 520 may be configured as or otherwise support a means for generating based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks. The communications manager 520 may be configured as or otherwise support a means for transmitting the retransmission message to the multiple UEs.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing a number of groupcast retransmissions for a set of code blocks, which may reduce resource consumption, reduce signaling overhead, and reduce processing, reduce power consumption, and result in a more efficient utilization of communication resources.

Figure 6:
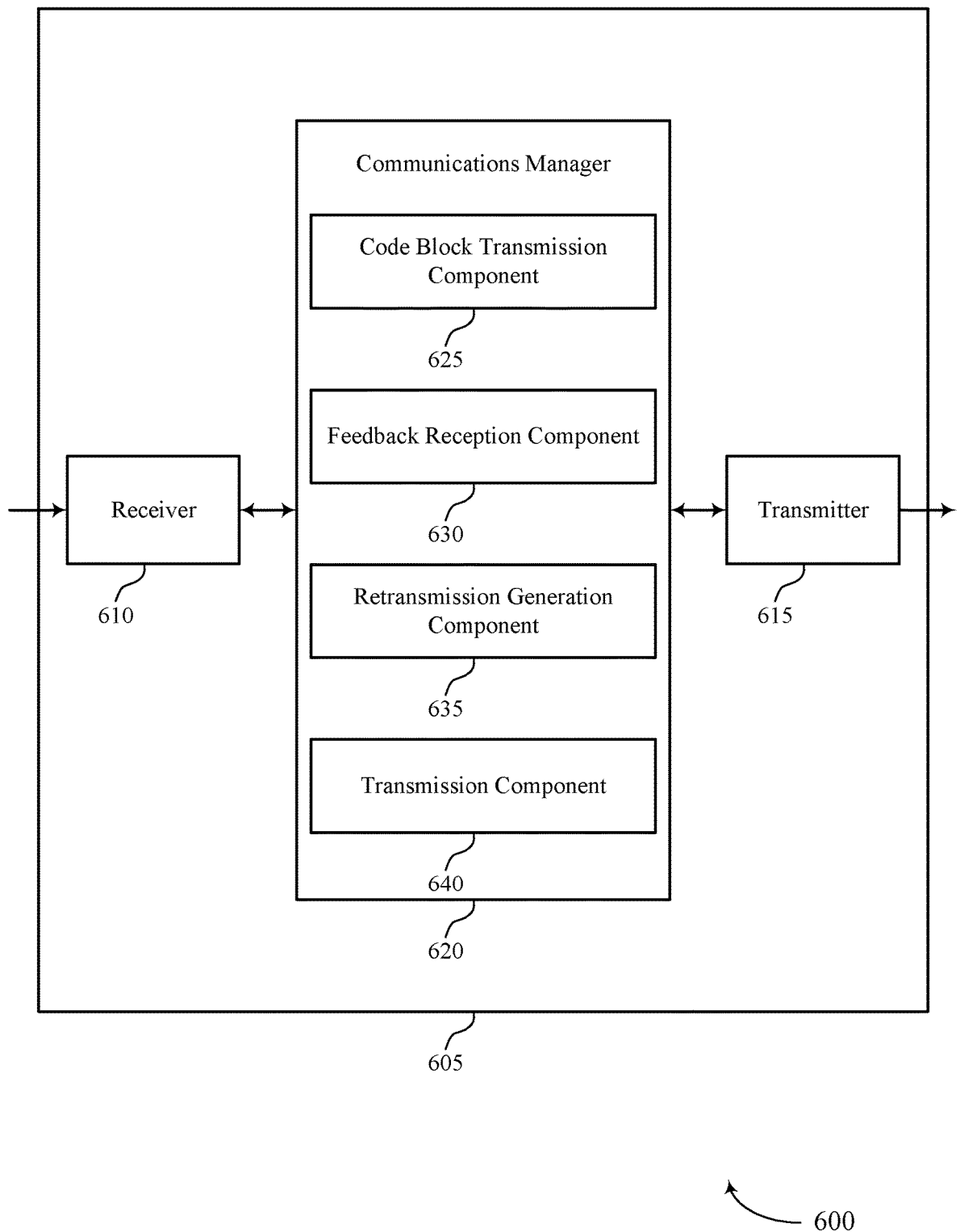

FIG. 6 shows a block diagram 600 of a device 605 that supports MIRS re-transmission optimization for groupcast utilizing network coding in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to MIRS re-transmission optimization for groupcast utilizing network coding). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to MIRS re-transmission optimization for groupcast utilizing network coding). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of MIRS re-transmission optimization for groupcast utilizing network coding as described herein. For example, the communications manager 620 may include a code block transmission component 625, a feedback reception component 630, a retransmission generation component 635, a transmission component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. The code block transmission component 625 may be configured as or otherwise support a means for transmitting, via one or more first transmissions and to multiple UEs, a set of multiple code blocks. The feedback reception component 630 may be configured as or otherwise support a means for receiving, from the multiple UEs, feedback pertaining to reception of each of the set of multiple code blocks at each of the multiple UEs. The retransmission generation component 635 may be configured as or otherwise support a means for generating based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks. The transmission component 640 may be configured as or otherwise support a means for transmitting the retransmission message to the multiple UEs.

Figure 7:
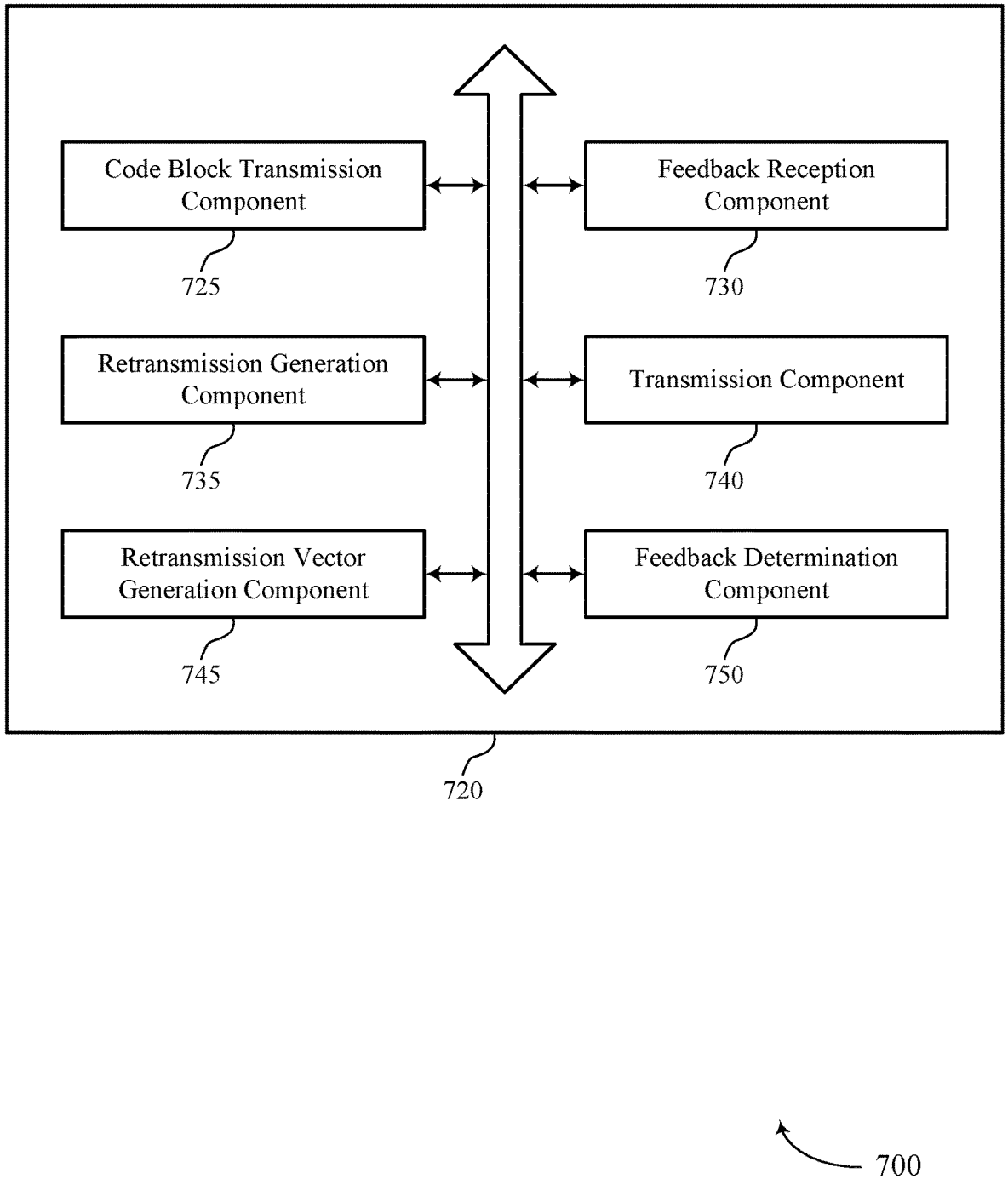
FIG. 7 shows a block diagram of a communications manager that supports MIRS re-transmission optimization for groupcast utilizing network coding in accordance with aspects of the present disclosure.

FIG. 7 shows a block diagram 700 of a communications manager 720 that supports MIRS re-transmission optimization for groupcast utilizing network coding in accordance with aspects of the present disclosure. The communications manager 720 may be an example of aspects of a communications manager 520, a communications manager 620, or both, as described herein. The communications manager 720, or various components thereof, may be an example of means for performing various aspects of MIRS re-transmission optimization for groupcast utilizing network coding as described herein. For example, the communications manager 720 may include a code block transmission component 725, a feedback reception component 730, a retransmission generation component 735, a transmission component 740, a retransmission vector generation component 745, a feedback determination component 750, or any combination thereof. Each of these components may communicate, directly or indirectly, with one another (e.g., via one or more buses).

The communications manager 720 may support wireless communication at a base station in accordance with examples as disclosed herein. The code block transmission component 725 may be configured as or otherwise support a means for transmitting, via one or more first transmissions and to multiple UEs, a set of multiple code blocks. The feedback reception component 730 may be configured as or otherwise support a means for receiving, from the multiple UEs, feedback pertaining to reception of each of the set of multiple code blocks at each of the multiple UEs. The retransmission generation component 735 may be configured as or otherwise support a means for generating based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks. The transmission component 740 may be configured as or otherwise support a means for transmitting the retransmission message to the multiple UEs.

In some examples, to support generating the retransmission message, the retransmission vector generation component 745 may be configured as or otherwise support a means for determining, for each of the multiple UEs and based on the feedback, a retransmission candidate vector indicative of the unsuccessfully decoded code blocks of the set of multiple code blocks for respective UEs of the multiple UEs. In some examples, to support generating the retransmission message, the retransmission vector generation component 745 may be configured as or otherwise support a means for combining the retransmission candidate vectors in accordance with a combining rule in order to identify a retransmission vector.

In some examples, the feedback determination component 750 may be configured as or otherwise support a means for determining that a first UE of the respective UEs indicated a successful decoding of a first code block of the set of multiple code blocks. In some examples, the feedback determination component 750 may be configured as or otherwise support a means for determining that a second UE of the respective UEs indicated an unsuccessful decoding of the first code block of the set of multiple code blocks. In some examples, the retransmission vector generation component 745 may be configured as or otherwise support a means for combining retransmission candidate vectors including the first code block based on the first UE indicating the successful decoding and the second UE indicating the unsuccessful decoding.

In some examples, each index of the retransmission candidate vector is associated with a code block of the set of multiple code blocks.

In some examples, to support determining the retransmission candidate vector, the retransmission vector generation component 745 may be configured as or otherwise support a means for setting a first index of the retransmission candidate vector to a first variable type based on the respective UE indicating an unsuccessful decoding of an associated first code block, where the first variable type is an integer value greater than or equal to 1 and indicates a number of units of the additional redundancy to send in the retransmission message. In some examples, to support determining the retransmission candidate vector, the retransmission vector generation component 745 may be configured as or otherwise support a means for setting a first set of indices of the retransmission candidate vector to a second variable type based on the respective UE indicating an unsuccessful decoding of an associated first set of code blocks. In some examples, to support determining the retransmission candidate vector, the retransmission vector generation component 745 may be configured as or otherwise support a means for setting a second set of indices of the retransmission candidate vector to a third variable type based on the UE indicating a successful decoding of an associated second set of code blocks.

In some examples, the retransmission vector generation component 745 may be configured as or otherwise support a means for comparing, as part of the combining in accordance with the combining rule, each index of a first retransmission candidate vector to each respective index of a second retransmission candidate vector.

In some examples, the retransmission vector generation component 745 may be configured as or otherwise support a means for combining the first retransmission candidate vector and the second retransmission candidate vector based on each index of the first retransmission candidate vector and the respective index of the second retransmission candidate vector being of a same variable type or at least one value of each respective index pair being of the third variable type.

In some examples, combining the first variable type with the first variable type outputs the first variable type, combining the second variable type with the second variable type outputs the second variable type, combining the third variable type with the third variable type outputs the third variable type, combining the first variable type with the third variable type outputs the first variable type, and combining the second variable type with the third variable outputs the second variable type.

In some examples, the retransmission vector generation component 745 may be configured as or otherwise support a means for stopping comparison of the first retransmission candidate vector and the second retransmission candidate vector based on at least one index of the first retransmission candidate vector being of the first variable type and the respective index of the second retransmission candidate vector being of the second variable type or vice versa.

In some examples, the encoded data representative of the set of code blocks of the set of multiple code blocks included in the retransmission message is combined using exclusive-or logic.

Figure 8:
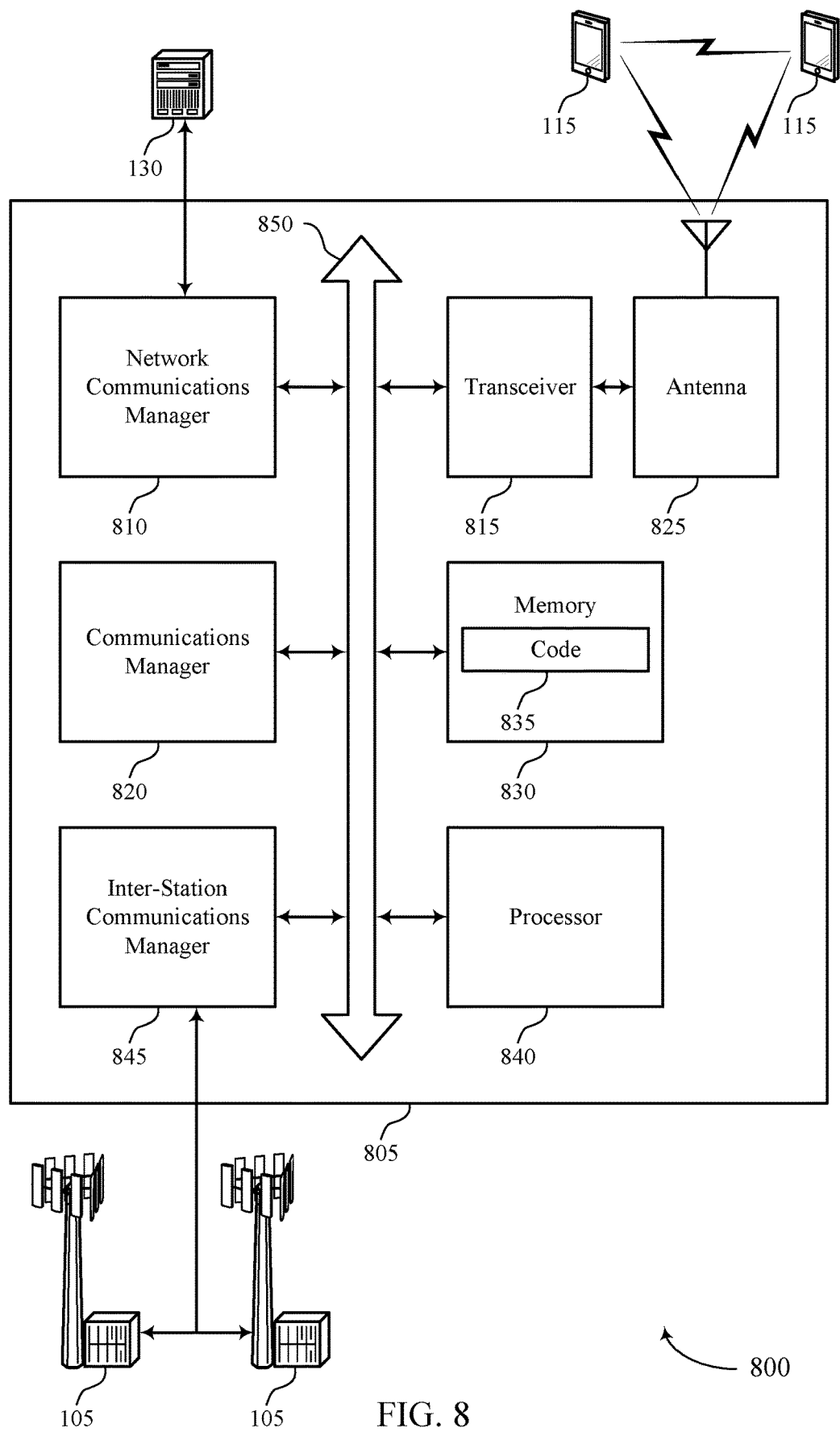
FIG. 8 shows a diagram of a system including a device that supports MIRS re-transmission optimization for groupcast utilizing network coding in accordance with aspects of the present disclosure.

FIG. 8 shows a diagram of a system 800 including a device 805 that supports MIRS re-transmission optimization for groupcast utilizing network coding in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting MIRS re-transmission optimization for groupcast utilizing network coding). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a base station in accordance with examples as disclosed herein. For example, the communications manager 820 may be configured as or otherwise support a means for transmitting, via one or more first transmissions and to multiple UEs, a set of multiple code blocks. The communications manager 820 may be configured as or otherwise support a means for receiving, from the multiple UEs, feedback pertaining to reception of each of the set of multiple code blocks at each of the multiple UEs. The communications manager 820 may be configured as or otherwise support a means for generating based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks. The communications manager 820 may be configured as or otherwise support a means for transmitting the retransmission message to the multiple UEs.

By including or configuring the communications manager 820 in accordance with examples as described herein, the device 805 may support techniques for reducing a number of groupcast retransmissions for a set of code blocks which may reduce resource consumption, reduce signaling overhead, and reduce processing, reduce power consumption, improve communication reliability, improve coordination between devices, and result in a more efficient utilization of communication resources In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of MIRS re-transmission optimization for groupcast utilizing network coding as described herein, or the processor 840 and the memory 830 may be otherwise configured to perform or support such operations.

Figure 9:
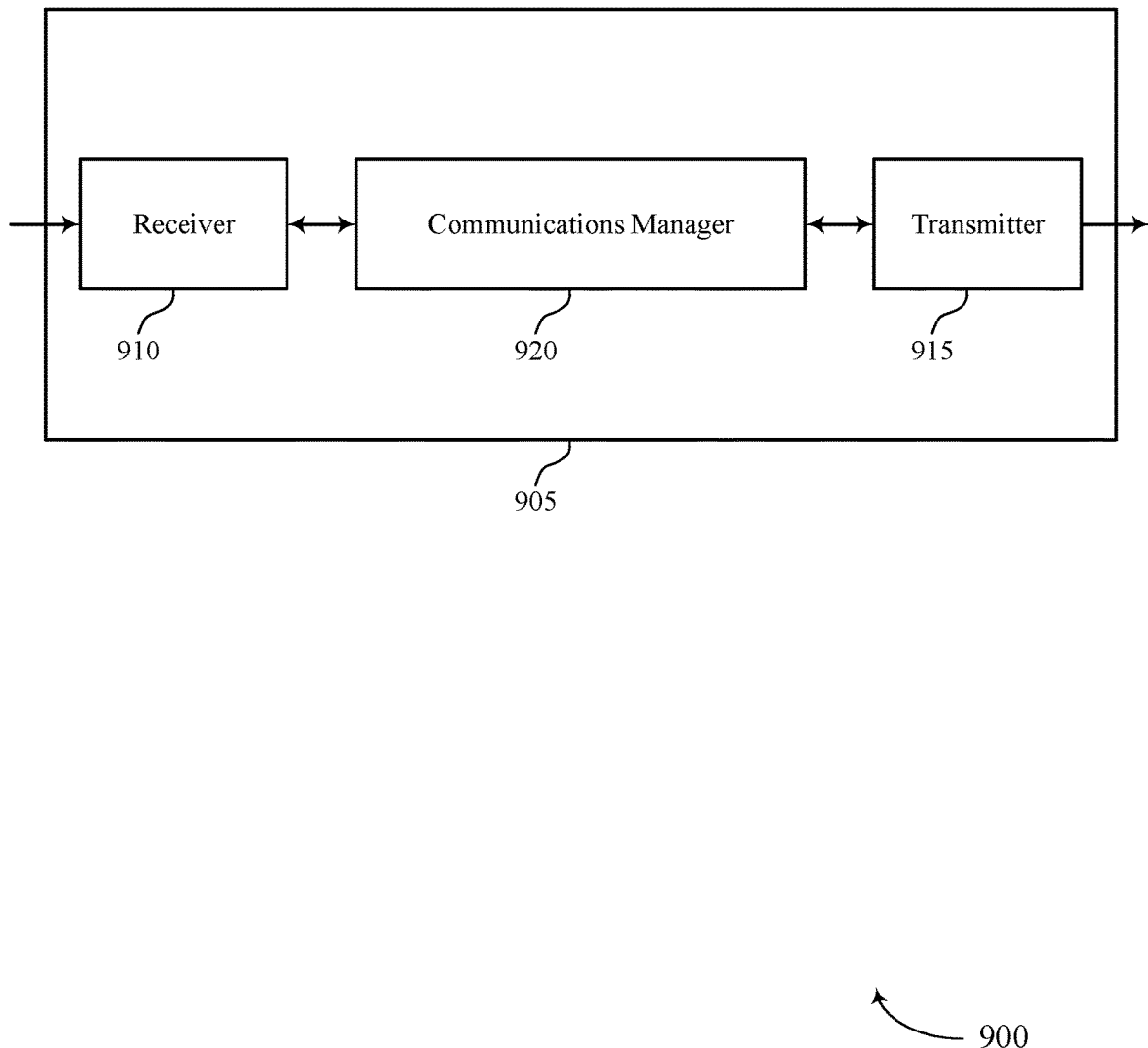
FIGS. 9 and 10 show block diagrams of devices that support MIRS re-transmission optimization for groupcast utilizing network coding in accordance with aspects of the present disclosure.

FIG. 9 shows a block diagram 900 of a device 905 that supports MIRS re-transmission optimization for groupcast utilizing network coding in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to MIRS re-transmission optimization for groupcast utilizing network coding). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to MIRS re-transmission optimization for groupcast utilizing network coding). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of MIRS re-transmission optimization for groupcast utilizing network coding as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, at the UE, a set of multiple code blocks transmitted by a base station to multiple UEs via one or more first transmissions. The communications manager 920 may be configured as or otherwise support a means for transmitting, to the base station, feedback for each of the set of multiple code blocks. The communications manager 920 may be configured as or otherwise support a means for receiving, in response to transmission of the feedback, a retransmission message that includes encoded data representative of a set of code blocks of the set of multiple code blocks, the encoded data including additional redundancy with respect to the one or more first transmissions. The communications manager 920 may be configured as or otherwise support a means for extracting, from the retransmission message, retransmissions of a portion of the set of code blocks, the portion corresponding to unsuccessfully decoded code blocks for which the UE transmitted a negative acknowledgment. The communications manager 920 may be configured as or otherwise support a means for combining the retransmissions of the portion of the set of code blocks with the unsuccessfully decoded code blocks to create updated combined versions of the unsuccessfully decoded code blocks. The communications manager 920 may be configured as or otherwise support a means for decoding the combined versions of the unsuccessfully decoded code blocks.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for which may reduce resource consumption, reduce signaling overhead, and reduce processing, reduce power consumption, and result in a more efficient utilization of communication resources.

Figure 10:
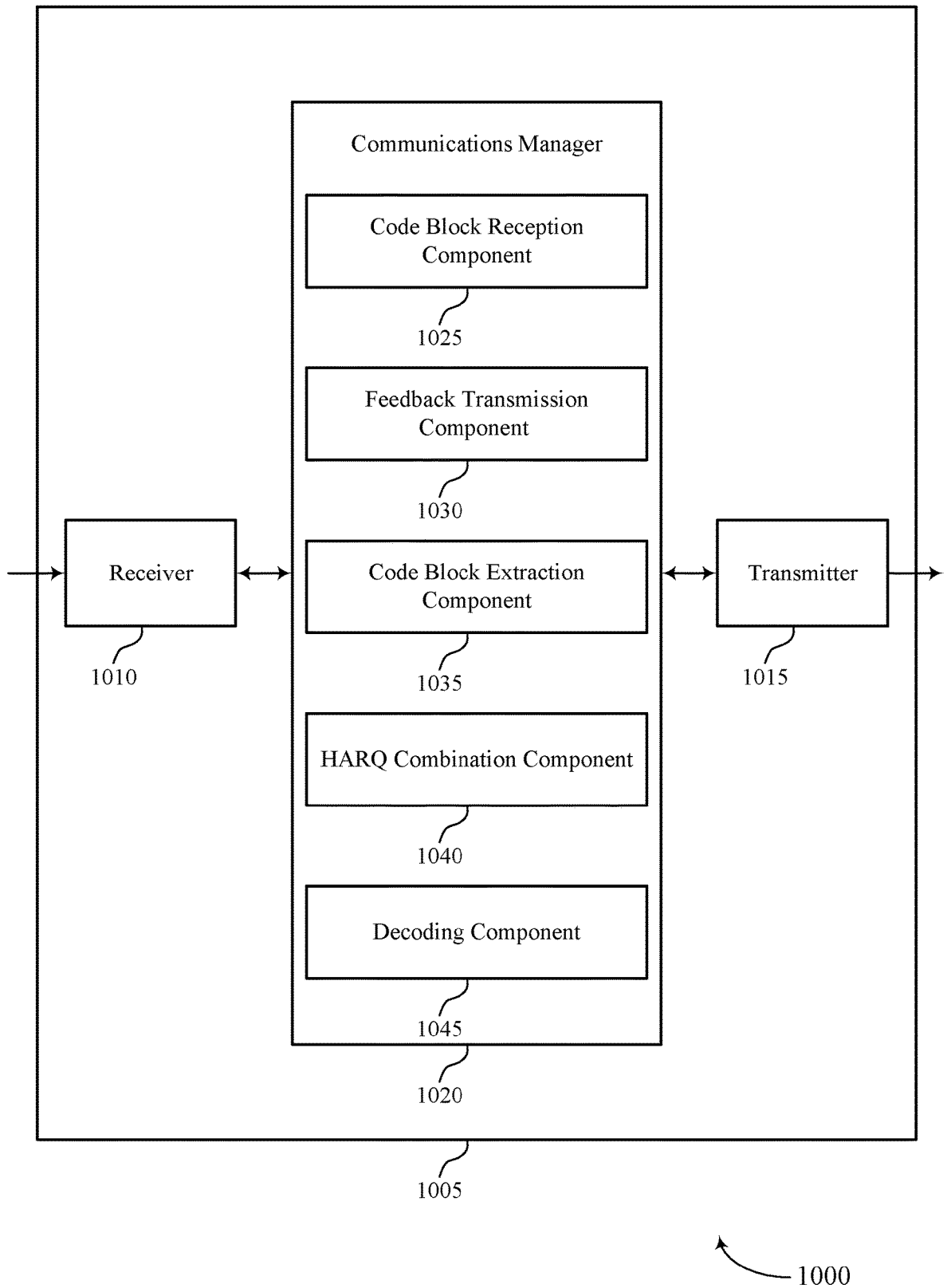

FIG. 10 shows a block diagram 1000 of a device 1005 that supports MIRS re-transmission optimization for groupcast utilizing network coding in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to MIRS re-transmission optimization for groupcast utilizing network coding). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to MIRS re-transmission optimization for groupcast utilizing network coding). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of MIRS re-transmission optimization for groupcast utilizing network coding as described herein. For example, the communications manager 1020 may include a code block reception component 1025, a feedback transmission component 1030, a code block extraction component 1035, an HARQ combination component 1040, a decoding component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The code block reception component 1025 may be configured as or otherwise support a means for receiving, at the UE, a set of multiple code blocks transmitted by a base station to multiple UEs via one or more first transmissions. The feedback transmission component 1030 may be configured as or otherwise support a means for transmitting, to the base station, feedback for each of the set of multiple code blocks. The code block reception component 1025 may be configured as or otherwise support a means for receiving, in response to transmission of the feedback, a retransmission message that includes encoded data representative of a set of code blocks of the set of multiple code blocks, the encoded data including additional redundancy with respect to the one or more first transmissions. The code block extraction component 1035 may be configured as or otherwise support a means for extracting, from the retransmission message, retransmissions of a portion of the set of code blocks, the portion corresponding to unsuccessfully decoded code blocks for which the UE transmitted a negative acknowledgment. The HARQ combination component 1040 may be configured as or otherwise support a means for combining the retransmissions of the portion of the set of code blocks with the unsuccessfully decoded code blocks to create updated combined versions of the unsuccessfully decoded code blocks. The decoding component 1045 may be configured as or otherwise support a means for decoding the combined versions of the unsuccessfully decoded code blocks.

Figure 11:
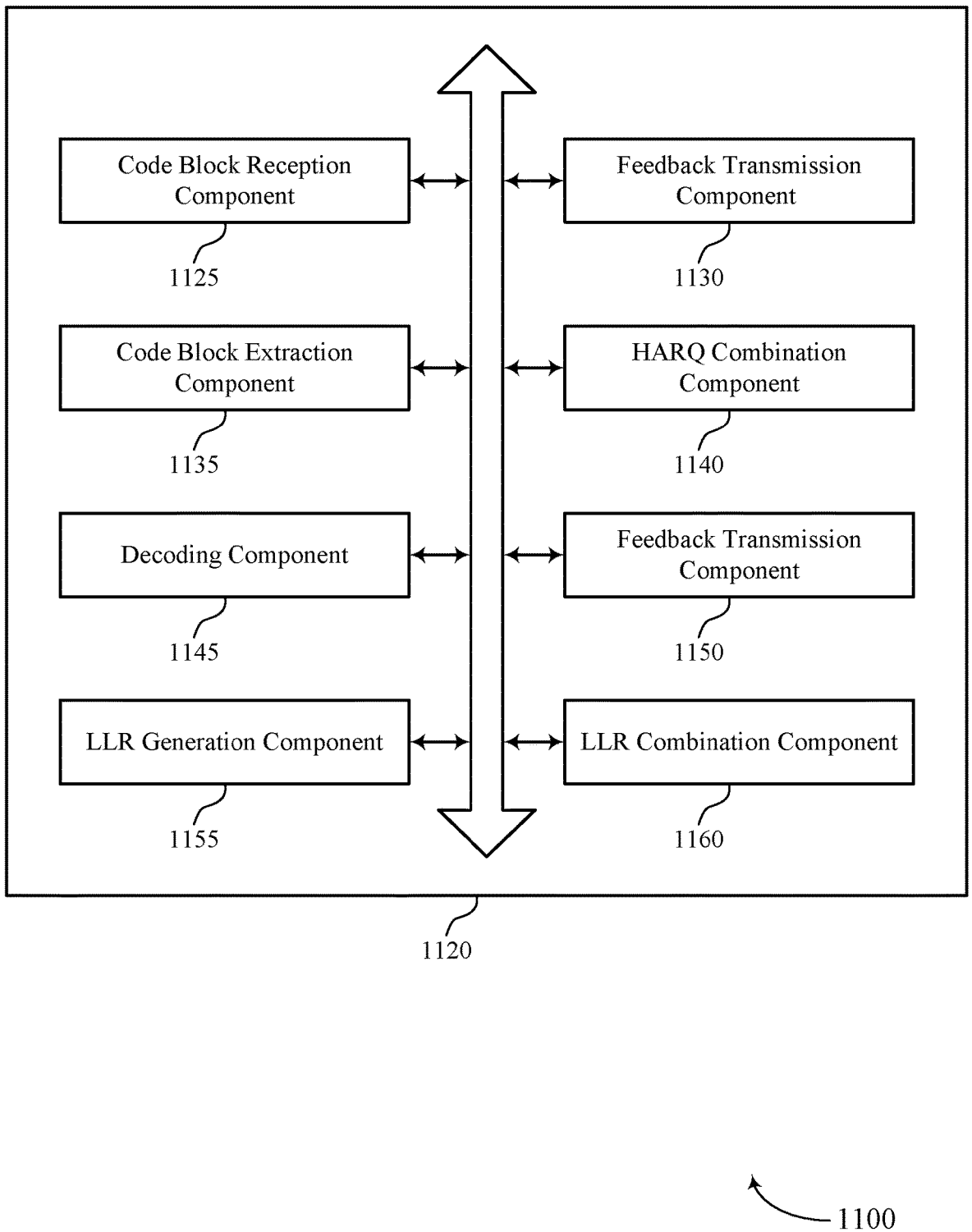
FIG. 11 shows a block diagram of a communications manager that supports MIRS re-transmission optimization for groupcast utilizing network coding in accordance with aspects of the present disclosure.

FIG. 11 shows a block diagram 1100 of a communications manager 1120 that supports MIRS re-transmission optimization for groupcast utilizing network coding in accordance with aspects of the present disclosure. The communications manager 1120 may be an example of aspects of a communications manager 920, a communications manager 1020, or both, as described herein. The communications manager 1120, or various components thereof, may be an example of means for performing various aspects of MIRS re-transmission optimization for groupcast utilizing network coding as described herein. For example, the communications manager 1120 may include a code block reception component 1125, a feedback transmission component 1130, a code block extraction component 1135, an HARQ combination component 1140, a decoding component 1145, a feedback transmission component 1150, an LLR generation component 1155, an LLR combination component 1160, or any combination thereof. Each of these components may communicate, directly or indirectly, with one another (e.g., via one or more buses).

The communications manager 1120 may support wireless communication at a UE in accordance with examples as disclosed herein. The code block reception component 1125 may be configured as or otherwise support a means for receiving, at the UE, a set of multiple code blocks transmitted by a base station to multiple UEs via one or more first transmissions. The feedback transmission component 1130 may be configured as or otherwise support a means for transmitting, to the base station, feedback for each of the set of multiple code blocks. In some examples, the code block reception component 1125 may be configured as or otherwise support a means for receiving, in response to transmission of the feedback, a retransmission message that includes encoded data representative of a set of code blocks of the set of multiple code blocks, the encoded data including additional redundancy with respect to the one or more first transmissions. The code block extraction component 1135 may be configured as or otherwise support a means for extracting, from the retransmission message, retransmissions of a portion of the set of code blocks, the portion corresponding to unsuccessfully decoded code blocks for which the UE transmitted a negative acknowledgment. The HARQ combination component 1140 may be configured as or otherwise support a means for combining the retransmissions of the portion of the set of code blocks with the unsuccessfully decoded code blocks to create updated combined versions of the unsuccessfully decoded code blocks. The decoding component 1145 may be configured as or otherwise support a means for decoding the combined versions of the unsuccessfully decoded code blocks.

In some examples, to support transmitting the feedback for each of the set of multiple code blocks, the feedback transmission component 1150 may be configured as or otherwise support a means for indicating a respective value representing an amount of additional redundancy for at least one of the code blocks of the set of multiple code blocks.

In some examples, to support extracting the retransmissions of the portion of the set of code blocks, the LLR generation component 1155 may be configured as or otherwise support a means for generating a first set of LLRs associated with the retransmissions of the portion of the set of code blocks.

In some examples, the LLR generation component 1155 may be configured as or otherwise support a means for performing a sign flip on the first set of LLRs associated with the retransmissions of the portion of the set of code blocks to generate a set of sign-flipped LLRs.

In some examples, to support combining the retransmissions of the portion of the set of code blocks with the unsuccessfully decoded code blocks, the HARQ combination component 1140 may be configured as or otherwise support a means for performing a HARQ combination of the retransmissions of the portion of the set of code blocks with the unsuccessfully decoded code blocks.

In some examples, the unsuccessfully decoded code blocks are associated with respective sets of LLRs.

In some examples, the retransmission message is modulated.

Figure 12:
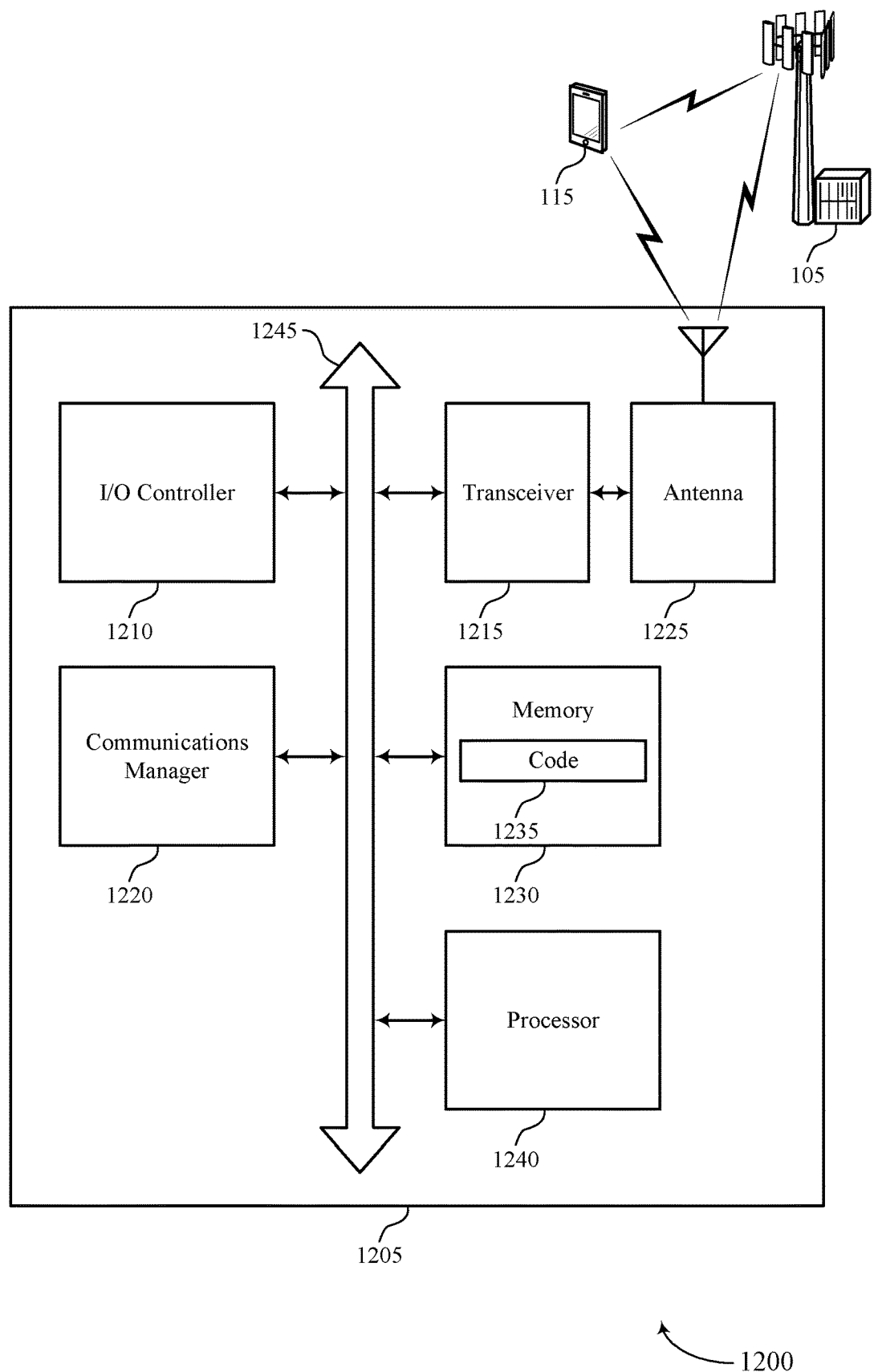
FIG. 12 shows a diagram of a system including a device that supports MIRS re-transmission optimization for groupcast utilizing network coding in accordance with aspects of the present disclosure.

FIG. 12 shows a diagram of a system 1200 including a device 1205 that supports MIRS re-transmission optimization for groupcast utilizing network coding in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting MIRS re-transmission optimization for groupcast utilizing network coding). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, at the UE, a set of multiple code blocks transmitted by a base station to multiple UEs via one or more first transmissions. The communications manager 1220 may be configured as or otherwise support a means for transmitting, to the base station, feedback for each of the set of multiple code blocks. The communications manager 1220 may be configured as or otherwise support a means for receiving, in response to transmission of the feedback, a retransmission message that includes encoded data representative of a set of code blocks of the set of multiple code blocks, the encoded data including additional redundancy with respect to the one or more first transmissions. The communications manager 1220 may be configured as or otherwise support a means for extracting, from the retransmission message, retransmissions of a portion of the set of code blocks, the portion corresponding to unsuccessfully decoded code blocks for which the UE transmitted a negative acknowledgment. The communications manager 1220 may be configured as or otherwise support a means for combining the retransmissions of the portion of the set of code blocks with the unsuccessfully decoded code blocks to create updated combined versions of the unsuccessfully decoded code blocks. The communications manager 1220 may be configured as or otherwise support a means for decoding the combined versions of the unsuccessfully decoded code blocks.

By including or configuring the communications manager 1220 in accordance with examples as described herein, the device 1205 may support techniques for reducing a number of groupcast retransmissions for a set of code blocks which may reduce resource consumption, reduce signaling overhead, and reduce processing, reduce power consumption, improve communication reliability, improve coordination between devices, and result in a more efficient utilization of communication resources In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of MIRS re-transmission optimization for groupcast utilizing network coding as described herein, or the processor 1240 and the memory 1230 may be otherwise configured to perform or support such operations.

Figure 13:
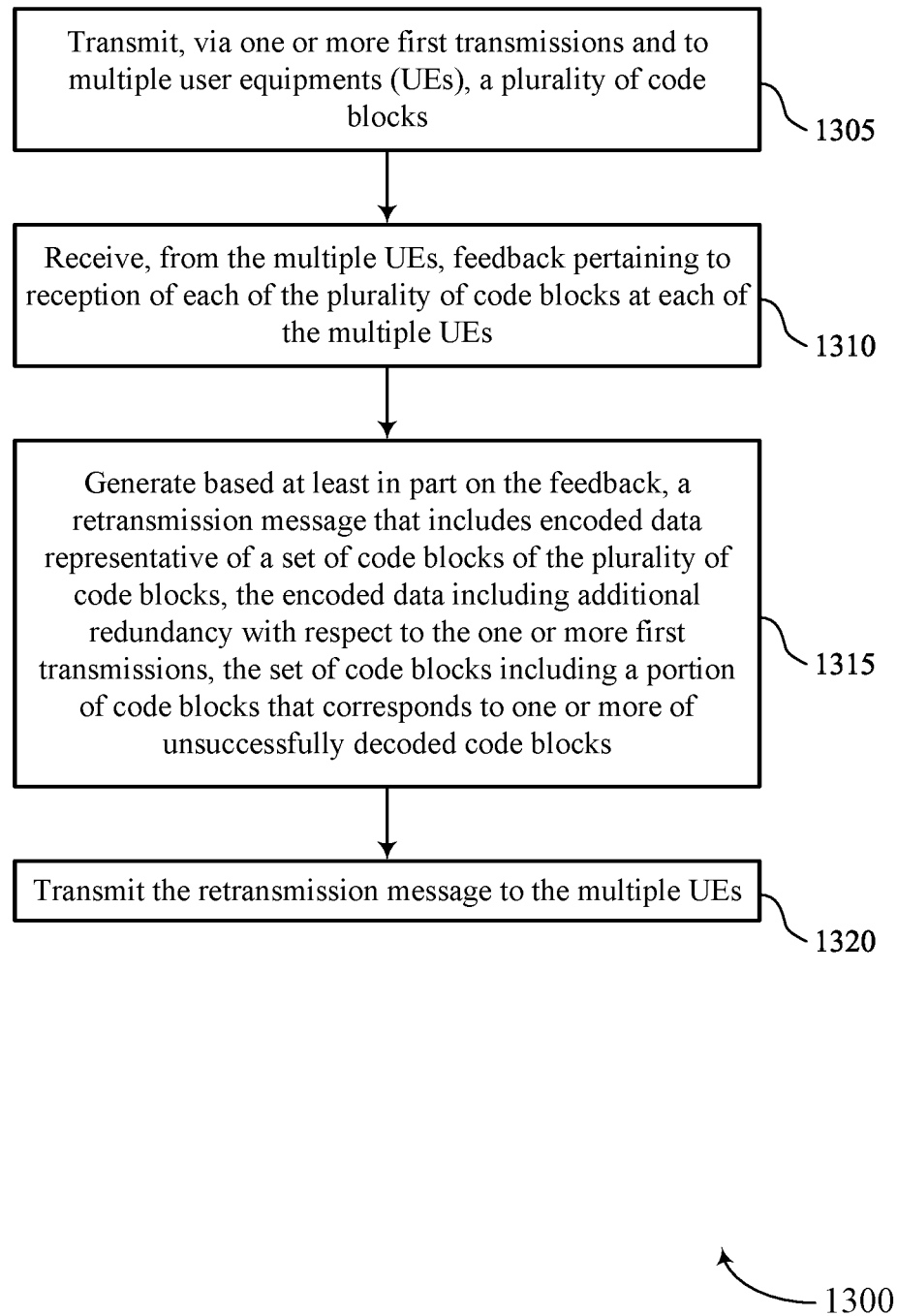
FIGS. 13 and 14 show flowcharts illustrating methods that support MIRS re-transmission optimization for groupcast utilizing network coding in accordance with aspects of the present disclosure.

FIG. 13 shows a flowchart illustrating a method 1300 that supports MIRS re-transmission optimization for groupcast utilizing network coding in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include transmitting, via one or more first transmissions and to multiple UEs, a set of multiple code blocks. The operations of 1305 may be performed in accordance with examples as disclosed herein. In some examples, aspects of the operations of 1305 may be performed by a code block transmission component 725 as described with reference to FIG. 7.

At 1310, the method may include receiving, from the multiple UEs, feedback pertaining to reception of each of the set of multiple code blocks at each of the multiple UEs. The operations of 1310 may be performed in accordance with examples as disclosed herein. In some examples, aspects of the operations of 1310 may be performed by a feedback reception component 730 as described with reference to FIG. 7.

At 1315, the method may include generating based on the feedback, a retransmission message that includes encoded data representative of a set of code blocks of the set of multiple code blocks, the encoded data including additional redundancy with respect to the one or more first transmissions, the set of code blocks including a portion of code blocks that corresponds to one or more of unsuccessfully decoded code blocks. The operations of 1315 may be performed in accordance with examples as disclosed herein. In some examples, aspects of the operations of 1315 may be performed by a retransmission generation component 735 as described with reference to FIG. 7.

At 1320, the method may include transmitting the retransmission message to the multiple UEs. The operations of 1320 may be performed in accordance with examples as disclosed herein. In some examples, aspects of the operations of 1320 may be performed by a transmission component 740 as described with reference to FIG. 7.

Figure 14:
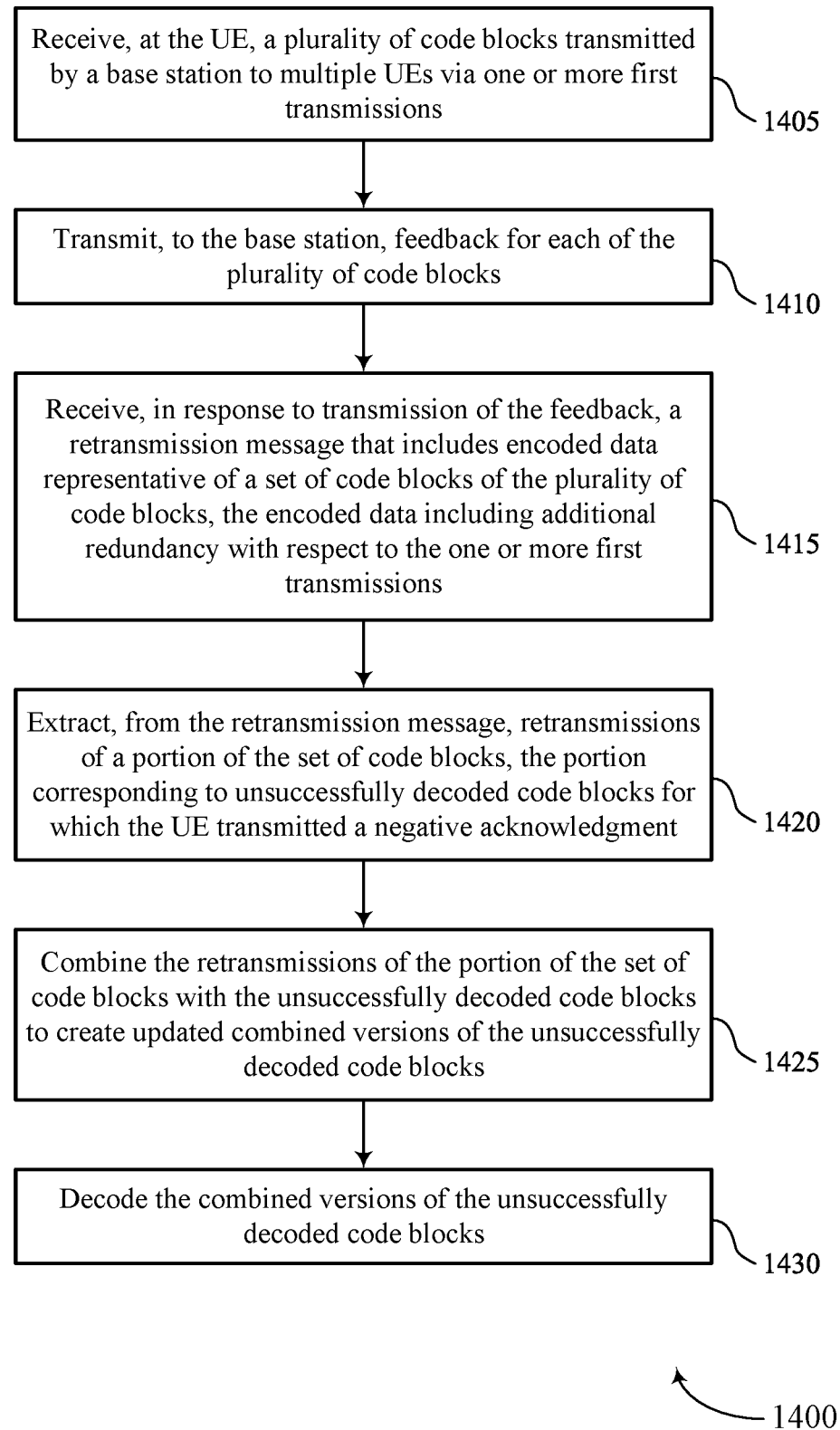

FIG. 14 shows a flowchart illustrating a method 1400 that supports MIRS re-transmission optimization for groupcast utilizing network coding in accordance with aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1405, the method may include receiving, at the UE, a set of multiple code blocks transmitted by a base station to multiple UEs via one or more first transmissions. The operations of 1405 may be performed in accordance with examples as disclosed herein. In some examples, aspects of the operations of 1405 may be performed by a code block reception component 1125 as described with reference to FIG. 11.

At 1410, the method may include transmitting, to the base station, feedback for each of the set of multiple code blocks. The operations of 1410 may be performed in accordance with examples as disclosed herein. In some examples, aspects of the operations of 1410 may be performed by a feedback transmission component 1130 as described with reference to FIG. 11.

At 1415, the method may include receiving, in response to transmission of the feedback, a retransmission message that includes encoded data representative of a set of code blocks of the set of multiple code blocks, the encoded data including additional redundancy with respect to the one or more first transmissions. The operations of 1415 may be performed in accordance with examples as disclosed herein. In some examples, aspects of the operations of 1415 may be performed by a code block reception component 1125 as described with reference to FIG. 11.

At 1420, the method may include extracting, from the retransmission message, retransmissions of a portion of the set of code blocks, the portion corresponding to unsuccessfully decoded code blocks for which the UE transmitted a negative acknowledgment. The operations of 1420 may be performed in accordance with examples as disclosed herein. In some examples, aspects of the operations of 1420 may be performed by a code block extraction component 1135 as described with reference to FIG. 11.

At 1425, the method may include combining the retransmissions of the portion of the set of code blocks with the unsuccessfully decoded code blocks to create updated combined versions of the unsuccessfully decoded code blocks. The operations of 1425 may be performed in accordance with examples as disclosed herein. In some examples, aspects of the operations of 1425 may be performed by an HARQ combination component 1140 as described with reference to FIG. 11.

At 1430, the method may include decoding the combined versions of the unsuccessfully decoded code blocks. The operations of 1430 may be performed in accordance with examples as disclosed herein. In some examples, aspects of the operations of 1430 may be performed by a decoding component 1145 as described with reference to FIG. 11.

The following provides an overview of aspects of the present disclosure:

Aspect 1: A method for wireless communication at a base station, including: transmitting, via one or more first transmissions and to multiple user equipments (UEs), multiple code blocks; receiving, from the multiple UEs, feedback pertaining to reception of each of the multiple code blocks at each of the multiple UEs; generating based on the feedback, a retransmission message that includes encoded data representative of a set of code blocks of the multiple code blocks, the encoded data including additional redundancy with respect to the one or more first transmissions, the set of code blocks including a portion of code blocks that corresponds to one or more of unsuccessfully decoded code blocks; and transmitting the retransmission message to the multiple UEs.

Aspect 2: The method of aspect 1, where generating the retransmission message further includes: determining, for each of the multiple UEs and based on the feedback, a retransmission candidate vector indicative of the unsuccessfully decoded code blocks of the multiple code blocks for respective UEs of the multiple UEs; and combining the retransmission candidate vectors in accordance with a combining rule in order to identify a retransmission vector.

Aspect 3: The method of aspect 2, further including: determining that a first UE of the respective UEs indicated a successful decoding of a first code block of the multiple code blocks; determining that a second UE of the respective UEs indicated an unsuccessful decoding of the first code block of the multiple code blocks; and combining retransmission candidate vectors including the first code block based on the first UE indicating the successful decoding and the second UE indicating the unsuccessful decoding.

Aspect 4: The method of any of aspects 2 through 3, where each index of the retransmission candidate vector is associated with a code block of the multiple code blocks.

Aspect 5: The method of aspect 4, where determining the retransmission candidate vector further includes: setting a first index of the retransmission candidate vector to a first variable type based on the respective UE indicating an unsuccessful decoding of an associated first code block, where the first variable type is an integer value greater than or equal to 1 and indicates a number of units of the additional redundancy to send in the retransmission message: setting a first set of indices of the retransmission candidate vector to a second variable type based on the respective UE indicating an unsuccessful decoding of an associated first set of code blocks; and setting a second set of indices of the retransmission candidate vector to a third variable type based on the UE indicating a successful decoding of an associated second set of code blocks.

Aspect 6: The method of aspect 5, further including: comparing, as part of the combining in accordance with the combining rule, each index of a first retransmission candidate vector to each respective index of a second retransmission candidate vector.

Aspect 7: The method of aspect 6, further including: combining the first retransmission candidate vector and the second retransmission candidate vector based on each index of the first retransmission candidate vector and the respective index of the second retransmission candidate vector being of a same variable type or at least one value of each respective index pair being of the third variable type.

Aspect 8: The method of aspect 7, where combining the first variable type with the first variable type outputs the first variable type, combining the second variable type with the second variable type outputs the second variable type, combining the third variable type with the third variable type outputs the third variable type, combining the first variable type with the third variable type outputs the first variable type, and combining the second variable type with the third variable outputs the second variable type.

Aspect 9: The method of any of aspects 6 through 8, further including: stopping comparison of the first retransmission candidate vector and the second retransmission candidate vector based on at least one index of the first retransmission candidate vector being of the first variable type and the respective index of the second retransmission candidate vector being of the second variable type or vice versa.

Aspect 10: The method of any of aspects 2 through 9, where the encoded data representative of the set of code blocks of the multiple code blocks included in the retransmission message is combined using XOR logic.

Aspect 11: A method for wireless communication at a UE, including: receiving, at the UE, a multiple code blocks transmitted by a base station to multiple UEs via one or more first transmissions; transmitting, to the base station, feedback for each of the multiple code blocks; receiving, in response to transmission of the feedback, a retransmission message that includes encoded data representative of a set of code blocks of the multiple code blocks, the encoded data including additional redundancy with respect to the one or more first transmissions: extracting, from the retransmission message, retransmissions of a portion of the set of code blocks, the portion corresponding to unsuccessfully decoded code blocks for which the UE transmitted a negative acknowledgment: combining the retransmissions of the portion of the set of code blocks with the unsuccessfully decoded code blocks to create updated combined versions of the unsuccessfully decoded code blocks; and decoding the combined versions of the unsuccessfully decoded code blocks.

Aspect 12: The method of aspect 11, where transmitting the feedback for each of the multiple code blocks further includes: indicating a respective value representing an amount of additional redundancy for at least one of the code blocks of the multiple code blocks.

Aspect 13: The method of any of aspects 11 through 12, where extracting the retransmissions of the portion of the set of code blocks further includes: generating a first set of LLRs associated with the retransmissions of the portion of the set of code blocks.

Aspect 14: The method of aspect 13, further including: performing a sign flip on the first set of LLRs associated with the retransmissions of the portion of the set of code blocks to generate a set of sign-flipped LLRs.

Aspect 15: The method of any of aspects 11 through 14, where combining the retransmissions of the portion of the set of code blocks with the unsuccessfully decoded code blocks further includes: performing a HARQ combination of the retransmissions of the portion of the set of code blocks with the unsuccessfully decoded code blocks.

Aspect 16: The method of any of aspects 11 through 15, where the unsuccessfully decoded code blocks are associated with respective sets of LLRs.

Aspect 17: The method of any of aspects 11 through 16, where the retransmission message is modulated.

Aspect 18: An apparatus for wireless communication at a base station, including a processor: memory coupled with the processor; and instructions stored in the memory and executable by the processor to cause the apparatus to perform a method of any of aspects 1 through 10.

Aspect 19: An apparatus for wireless communication at a base station, including at least one means for performing a method of any of aspects 1 through 10.

Aspect 20: A non-transitory computer-readable medium storing code for wireless communication at a base station, the code including instructions executable by a processor to perform a method of any of aspects 1 through 10.

Aspect 21: An apparatus for wireless communication at a UE, including a processor: memory coupled with the processor; and instructions stored in the memory and executable by the processor to cause the apparatus to perform a method of any of aspects 11 through 17.

Aspect 22: An apparatus for wireless communication at a UE, including at least one means for performing a method of any of aspects 11 through 17.

Aspect 23: A non-transitory computer-readable medium storing code for wireless communication at a UE, the code including instructions executable by a processor to perform a method of any of aspects 11 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network entity, comprising:
    transmitting, via one or more first transmissions and to multiple user equipments (UEs), a plurality of code blocks;
    receiving, from the multiple UEs, respective feedback pertaining to reception of each of the plurality of code blocks at each of the multiple UEs;
    generating, for each of the multiple UEs, a respective set of retransmission candidate vectors based at least in part on the respective feedback wherein a quantity of retransmission candidate vectors included in each respective set of retransmission candidate vectors is equal to a quantity of code blocks of the plurality of code blocks unsuccessfully decoded by a respective UE;
    generating, based at least in part on the respective feedback, a retransmission message that includes encoded data representative of a set of code blocks of the plurality of code blocks, the encoded data including additional redundancy with respect to the one or more first transmissions, the set of code blocks including a portion of code blocks that corresponds to one or more of unsuccessfully decoded code blocks based at least in part on a retransmission vector that is a combination of each retransmission candidate vector of the respective sets of retransmission candidate vectors according to a combining rule; and
    transmitting the retransmission message to the multiple UEs.

2. The method of claim 1, wherein generating the respective set of retransmission candidate vectors further comprises:
    determining, based at least in part on the respective feedback, a first retransmission candidate vector of a first set of retransmission candidate vectors, wherein the first retransmission candidate vector is indicative of the unsuccessfully decoded code blocks of the plurality of code blocks for a first UE of the multiple UEs.

3. The method of claim 2, wherein each index of the first retransmission candidate vector is associated with a code block of the plurality of code blocks.

4. The method of claim 3, wherein determining the first retransmission candidate vector further comprises:
setting a first index of the first retransmission candidate vector to a first variable type based at least in part on the first UE indicating an unsuccessful decoding of an associated first code block, wherein the first variable type is an integer value greater than or equal to 1 and indicates a number of units of the additional redundancy to send in the retransmission message;
setting a first set of indices of the first retransmission candidate vector to a second variable type based at least in part on the first UE indicating an unsuccessful decoding of an associated first set of code blocks; and
setting a second set of indices of the first retransmission candidate vector to a third variable type based at least in part on the first UE indicating a successful decoding of an associated second set of code blocks.

5. The method of claim 4, further comprising:
comparing, as part of the combining in accordance with the combining rule, each index of the first retransmission candidate vector to each respective index of a second retransmission candidate vector.

6. The method of claim 5, further comprising:
combining the first retransmission candidate vector and the second retransmission candidate vector based at least in part on each index of the first retransmission candidate vector and the respective index of the second retransmission candidate vector being of a same variable type or at least one value of each respective index pair being of the third variable type.

7. The method of claim 6, wherein combining the first variable type with the first variable type outputs the first variable type, combining the second variable type with the second variable type outputs the second variable type, combining the third variable type with the third variable type outputs the third variable type, combining the first variable type with the third variable type outputs the first variable type, and combining the second variable type with the third variable outputs the second variable type.

8. The method of claim 5, further comprising:
stopping comparison of the first retransmission candidate vector and the second retransmission candidate vector based at least in part on at least one index of the first retransmission candidate vector being of the first variable type and the respective index of the second retransmission candidate vector being of the second variable type or vice versa.

9. The method of claim 1, further comprising:
determining that a first UE of the multiple UEs indicated a successful decoding of a first code block of the plurality of code blocks;
determining that a second UE of the multiple UEs indicated an unsuccessful decoding of the first code block of the plurality of code blocks; and
combining respective retransmission candidate vectors comprising the first code block based at least in part on the first UE indicating the successful decoding and the second UE indicating the unsuccessful decoding.

10. The method of claim 1, wherein the encoded data representative of the set of code blocks of the plurality of code blocks included in the retransmission message is combined using exclusive-or logic.

11. A method for wireless communication at a user equipment (UE), comprising:
receiving, at the UE, a plurality of code blocks transmitted by a network entity to multiple UEs via one or more first transmissions;
transmitting, to the network entity, feedback for each of the plurality of code blocks, wherein the feedback is indicative of a set of retransmission candidate vectors for the UE, and wherein a quantity of retransmission candidate vectors included in the set of retransmission candidate vectors is equal to a quantity of code blocks of the plurality of code blocks unsuccessfully decoded by the UE;
receiving, in response to transmission of the feedback, a retransmission message that includes encoded data representative of a set of code blocks of the plurality of code blocks, the encoded data including additional redundancy with respect to the one or more first transmissions, wherein the set of code blocks of the plurality of code blocks of the encoded data are based at least in part on a retransmission vector that is a combination, according to a combining rule, of the set of retransmission candidate vectors for the UE and a set of retransmission candidate vectors for a second UE;
extracting, from the retransmission message, retransmissions of a portion of the set of code blocks, the portion corresponding to unsuccessfully decoded code blocks for which the UE transmitted a negative acknowledgment;
combining the retransmissions of the portion of the set of code blocks with the unsuccessfully decoded code blocks to create updated combined versions of the unsuccessfully decoded code blocks; and
decoding the combined versions of the unsuccessfully decoded code blocks.

12. The method of claim 11, wherein transmitting the feedback for each of the plurality of code blocks further comprises:
indicating a respective value representing an amount of additional redundancy for at least one of the code blocks of the plurality of code blocks.

13. The method of claim 11, wherein extracting the retransmissions of the portion of the set of code blocks further comprises:
generating a first set of logarithmic likelihood ratios associated with the retransmissions of the portion of the set of code blocks.

14. The method of claim 13, further comprising:
performing a sign flip on the first set of logarithmic likelihood ratios associated with the retransmissions of the portion of the set of code blocks to generate a set of sign-flipped logarithmic likelihood ratios.

15. The method of claim 11, wherein combining the retransmissions of the portion of the set of code blocks with the unsuccessfully decoded code blocks further comprises:
performing a hybrid automatic repeat request combination of the retransmissions of the portion of the set of code blocks with the unsuccessfully decoded code blocks.

16. The method of claim 11, wherein the unsuccessfully decoded code blocks are associated with respective sets of logarithmic likelihood ratios.

17. The method of claim 11, wherein the retransmission message is modulated.

18. An apparatus for wireless communication at a network entity, comprising:
at least one processor;
at least one memory coupled with the at least one processor; and
instructions stored in the at least one memory and executable by the at least one processor to cause the apparatus to:

transmit, via one or more first transmissions and to multiple user equipments (UEs), a plurality of code blocks;

receive, from the multiple UEs, respective feedback pertaining to reception of each of the plurality of code blocks at each of the multiple UEs;

generate, for each the multiple UEs, a respective set of retransmission candidate vectors based at least in part on the respective feedback wherein a quantity of retransmission candidate vectors included in each respective set of retransmission candidate vectors is equal to a quantity of code blocks of the plurality of code blocks unsuccessfully decoded by a respective UE;

generate, based at least in part on the respective feedback, a retransmission message that includes encoded data representative of a set of code blocks of the plurality of code blocks, the encoded data including additional redundancy with respect to the one or more first transmissions, the set of code blocks including a portion of code blocks that corresponds to one or more of unsuccessfully decoded code blocks based at least in part on a retransmission vector that is a combination of each retransmission candidate vector of the respective sets of retransmission candidate vectors according to a combining rule; and transmit the retransmission message to the multiple UEs.

19. The apparatus of claim 18, wherein the instructions to generate the retransmission message are further executable by the at least one processor to cause the apparatus to:

determine, based at least in part on the feedback, a first retransmission candidate vector of a first set of retransmission candidate vectors, wherein the first retransmission candidate vector is indicative of unsuccessfully decoded code blocks of the plurality of code blocks for a first UE of the multiple UEs.

20. The apparatus of claim 19, wherein each index of the first retransmission candidate vector is associated with a code block of the plurality of code blocks.

21. The apparatus of claim 20, wherein the instructions to determine the first retransmission candidate vector are further executable by the at least one processor to cause the apparatus to:

set a first index of the first retransmission candidate vector to a first variable type based at least in part on the first UE indicating an unsuccessful decoding of an associated first code block, wherein the first variable type is an integer value greater than or equal to 1 and indicates a number of units of the additional redundancy to send in the retransmission message;

set a first set of indices of the first retransmission candidate vector to a second variable type based at least in part on the first UE indicating an unsuccessful decoding of an associated first set of code blocks; and set a second set of indices of the first retransmission candidate vector to a third variable type based at least in part on the first UE indicating a successful decoding of an associated second set of code blocks.

22. The apparatus of claim 21, wherein the instructions are further executable by the at least one processor to cause the apparatus to:

compare, as part of the combining in accordance with the combining rule, each index of the first retransmission candidate vector to each respective index of a second retransmission candidate vector.

23. The apparatus of claim 22, wherein the instructions are further executable by the at least one processor to cause the apparatus to:

combine the first retransmission candidate vector and the second retransmission candidate vector based at least in part on each index of the first retransmission candidate vector and the respective index of the second retransmission candidate vector being of a same variable type or at least one value of each respective index pair being of the third variable type.

24. The apparatus of claim 23, wherein combining the first variable type with the first variable type outputs the first variable type, combining the second variable type with the second variable type outputs the second variable type, combining the third variable type with the third variable type outputs the third variable type, combining the first variable type with the third variable type outputs the first variable type, and combining the second variable type with the third variable outputs the second variable type.

25. The apparatus of claim 22, wherein the instructions are further executable by the at least one processor to cause the apparatus to:

stop comparison of the first retransmission candidate vector and the second retransmission candidate vector based at least in part on at least one index of the first retransmission candidate vector being of the first variable type and the respective index of the second retransmission candidate vector being of the second variable type or vice versa.

26. The apparatus of claim 18, wherein the instructions are further executable by the at least one processor to cause the apparatus to:

determine that a first UE of the multiple UEs indicated a successful decoding of a first code block of the plurality of code blocks;

determine that a second UE of the multiple UEs indicated an unsuccessful decoding of the first code block of the plurality of code blocks; and combine retransmission candidate vectors comprising the first code block based at least in part on the first UE indicating the successful decoding and the second UE indicating the unsuccessful decoding.

27. The apparatus of claim 18, wherein the encoded data representative of the set of code blocks of the plurality of code blocks included in the retransmission message is combined using exclusive-or logic.

28. An apparatus for wireless communication at a user equipment (UE), comprising:

at least one processor;

at least one memory coupled with the at least one processor; and instructions stored in the at least one memory and executable by the at least one processor to cause the apparatus to:

receive, at the UE, a plurality of code blocks transmitted by a network entity to multiple UEs via one or more first transmissions;

transmit, to the network entity, feedback for each of the plurality of code blocks, wherein the feedback is indicative of a set of retransmission candidate vectors for the UE, and wherein a quantity of retransmission candidate vectors included in the respective set of retransmission candidate vectors is equal to a quantity of code blocks of the plurality of code blocks unsuccessfully decoded by the UE;

receive, in response to transmission of the feedback, a retransmission message that includes encoded data representative of a set of code blocks of the plurality of code blocks, the encoded data including additional redundancy with respect to the one or more first transmissions, wherein the set of code blocks of the plurality of code blocks of the encoded data are based at least in part on a retransmission vector that is a combination, according to a combining rule, of the set of retransmission candidate vectors for the UE and a set of retransmission candidate vectors for a second UE;

extract, from the retransmission message, retransmissions of a portion of the set of code blocks, the portion corresponding to unsuccessfully decoded code blocks for which the UE transmitted a negative acknowledgment;

combine the retransmissions of the portion of the set of code blocks with the unsuccessfully decoded code blocks to create updated combined versions of the unsuccessfully decoded code blocks; and decode the combined versions of the unsuccessfully decoded code blocks.

29. The apparatus of claim 28, wherein the instructions to transmit the feedback for each of the plurality of code blocks are further executable by the at least one processor to cause the apparatus to:

indicate a respective value representing an amount of additional redundancy for at least one of the code blocks of the plurality of code blocks.

30. The apparatus of claim 28, wherein the instructions to extract the retransmissions of the portion of the set of code blocks are further executable by the at least one processor to cause the apparatus to:

generate a first set of logarithmic likelihood ratios associated with the retransmissions of the portion of the set of code blocks.

* * * * *